(12) United States Patent
Yu et al.

(10) Patent No.: US 8,848,273 B2
(45) Date of Patent: Sep. 30, 2014

(54) AMPLITUDE, PHASE AND POLARIZATION PLATE FOR PHOTONICS

(71) Applicants: Nanfang Yu, New York, NY (US); Federico Capasso, Cambridge, MA (US); Zeno Gaburro, Trento (IT); Patrice Genevet, Cambridge, MA (US); Mikhail Kats, Cambridge, MA (US); Francesco Aieta, Cambridge, MA (US)

(72) Inventors: Nanfang Yu, New York, NY (US); Federico Capasso, Cambridge, MA (US); Zeno Gaburro, Trento (IT); Patrice Genevet, Cambridge, MA (US); Mikhail Kats, Cambridge, MA (US); Francesco Aieta, Cambridge, MA (US)

(73) Assignees: President and Fellows of Harvard College, Cambridge, MA (US); Universita degli Studi di Trento, Trento (IT)

( * ) Notice: Subject to any disclaimer, the term of this patent is extended or adjusted under 35 U.S.C. 154(b) by 0 days.

(21) Appl. No.: 13/832,403

(22) Filed: Mar. 15, 2013

(65) Prior Publication Data
US 2013/0208332 A1    Aug. 15, 2013

Related U.S. Application Data

(63) Continuation-in-part of application No. PCT/US2012/053434, filed on Aug. 31, 2012.

(60) Provisional application No. 61/529,353, filed on Aug. 31, 2011.

(51) Int. Cl.
*G02F 1/01* (2006.01)
*G02B 1/00* (2006.01)
*H01Q 15/00* (2006.01)
*H01Q 15/10* (2006.01)
*B82Y 20/00* (2011.01)

(52) U.S. Cl.
CPC ............. *G02F 1/01* (2013.01); *G02F 2203/10* (2013.01); *G02B 1/002* (2013.01); *Y10S 977/774* (2013.01); *B82Y 20/00* (2013.01); *H01Q 15/0006* (2013.01); *H01Q 15/10* (2013.01); *Y10S 977/773* (2013.01)
USPC .......................... 359/238; 977/774; 977/773

(58) Field of Classification Search
USPC ........................ 359/280, 238, 276, 278, 279
See application file for complete search history.

(56) References Cited

U.S. PATENT DOCUMENTS

2009/0230333 A1*    9/2009   Eleftheriades ............. 250/505.1
2011/0019180 A1*    1/2011   Kruglick ...................... 356/51

OTHER PUBLICATIONS

United States Patent and Trademark Office, International Search Report and Written Opinion for PCT/US12/53434 (Dec. 17, 2012).
Nanfang Yu, et al., "Light Propagation with Phase Discontinuities: Generalized Laws of Reflection and Refraction", 334 Science 333-337, with supporting online material (Oct. 21, 2011).

* cited by examiner

*Primary Examiner* — Joseph P Martinez
(74) *Attorney, Agent, or Firm* — Modern Times Legal; Robert J. Sayre

(57) ABSTRACT

An optical plate includes a substrate and a resonator structure formed on or in the substrate, wherein the resonator structure is configured to produce an abrupt change in phase, amplitude and/or polarization of incident radiation.

40 Claims, 19 Drawing Sheets

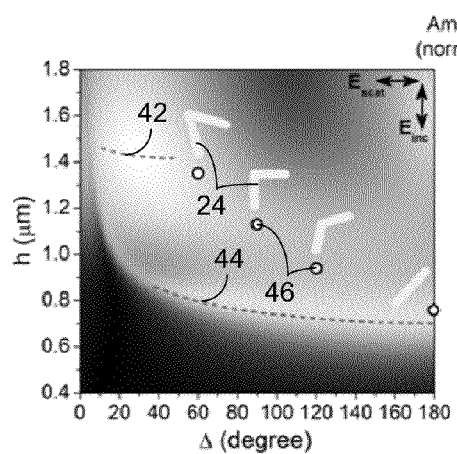
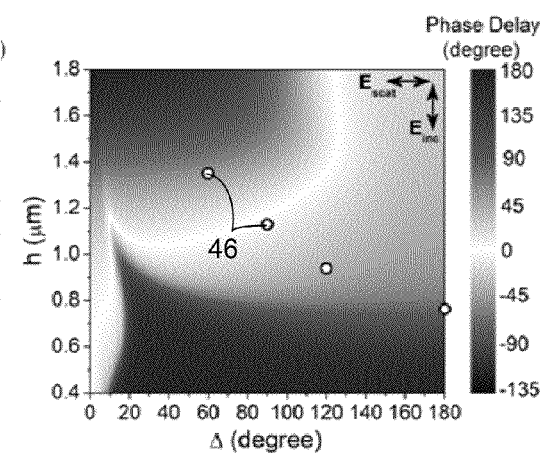
FIG. 11    FIG. 12
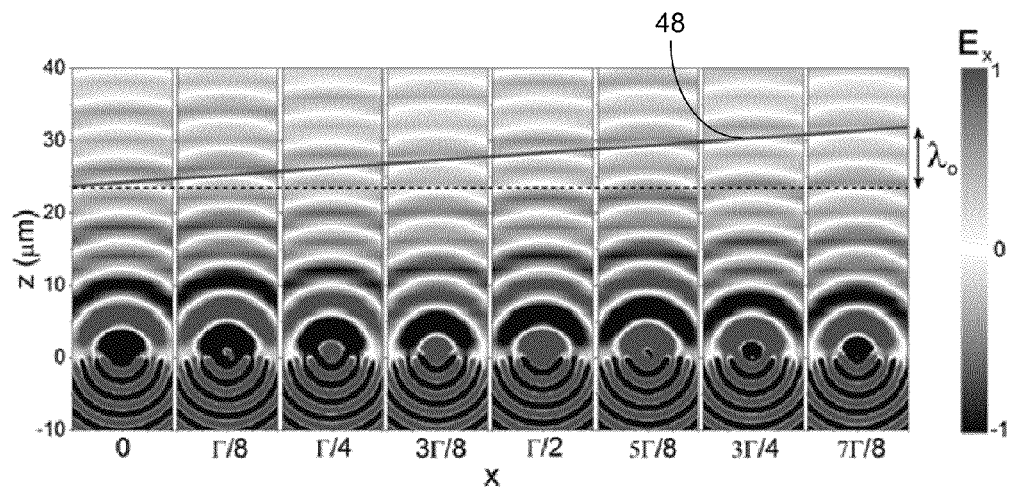
FIG. 14
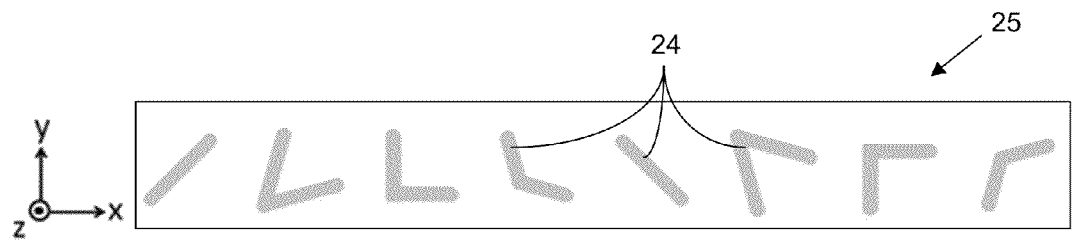
FIG. 13

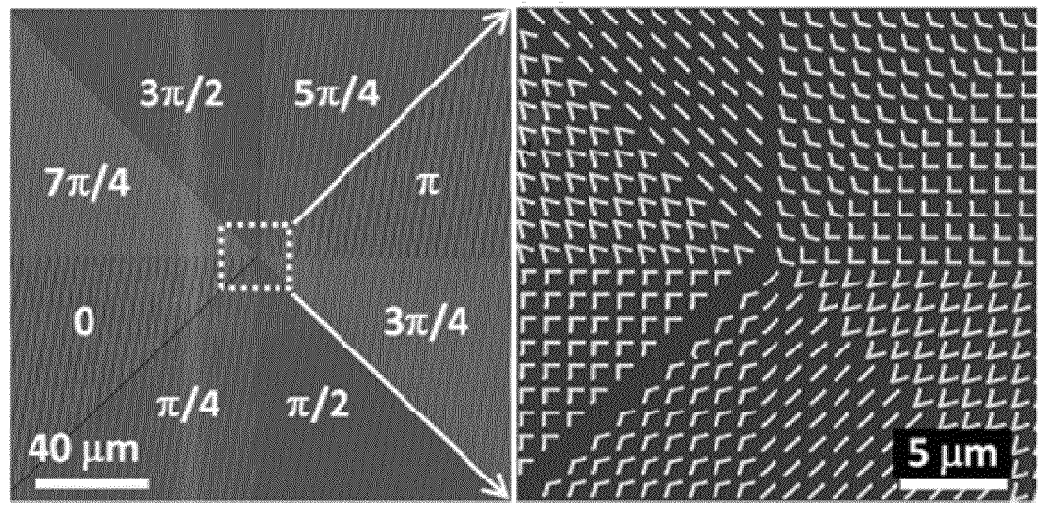
FIG. 21    FIG. 22
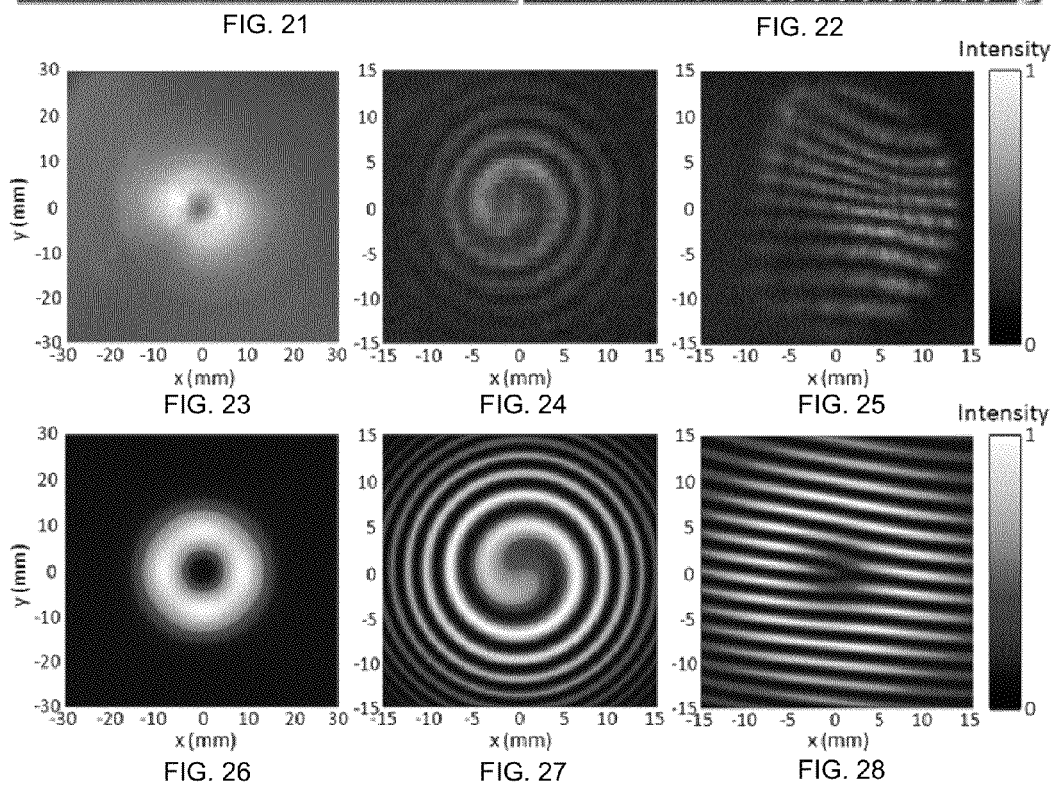
FIG. 23    FIG. 24    FIG. 25
FIG. 26    FIG. 27    FIG. 28

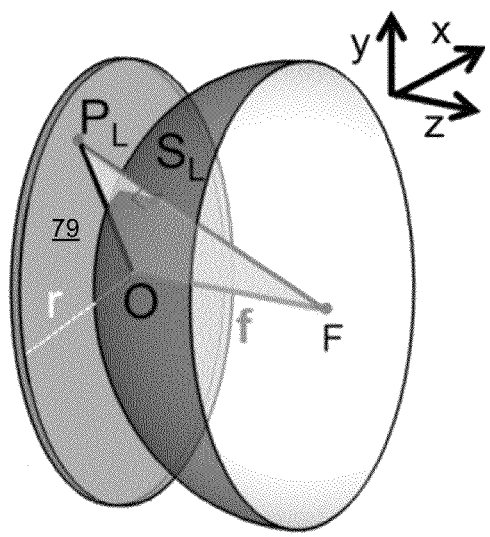 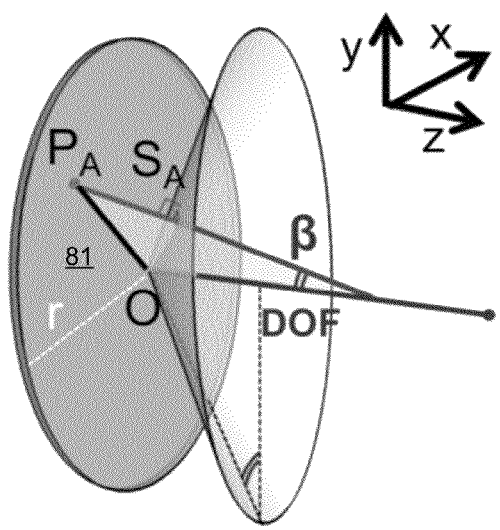
FIG. 32  FIG. 34
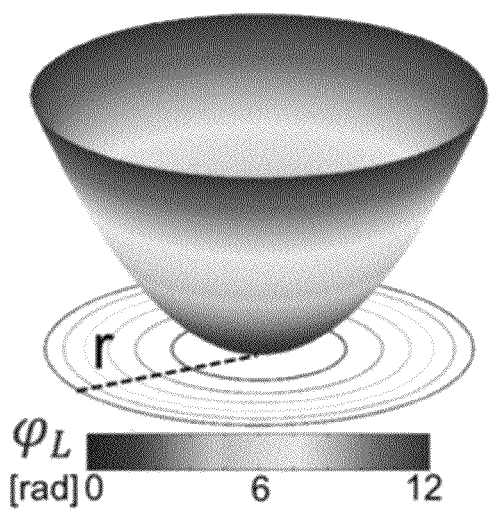 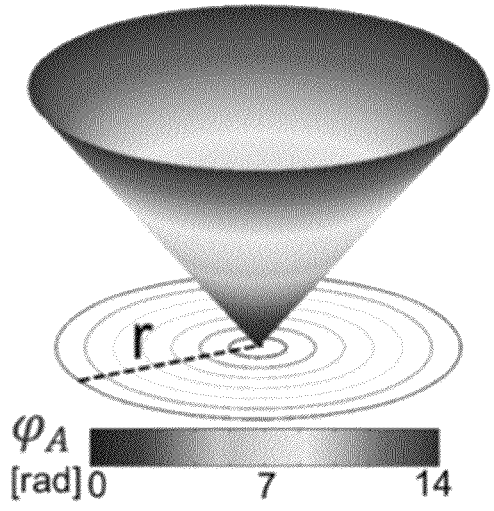
FIG. 33  FIG. 35

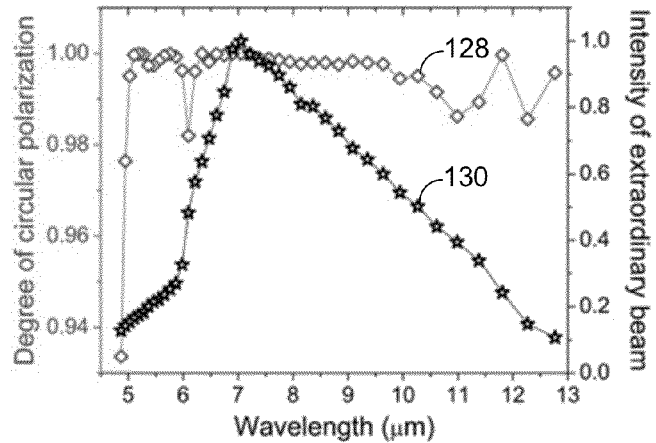
FIG. 52
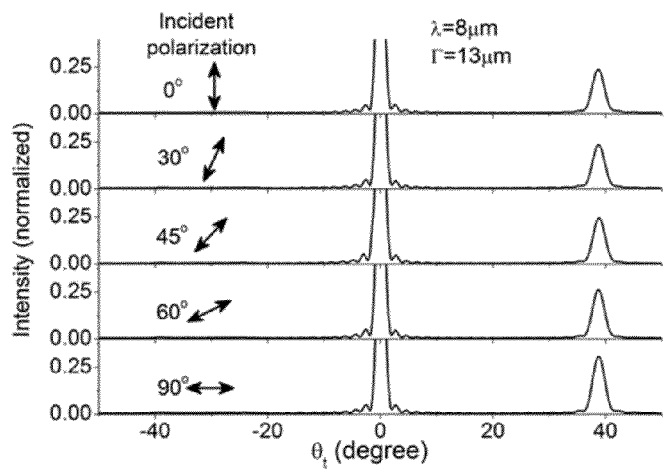
FIG. 54
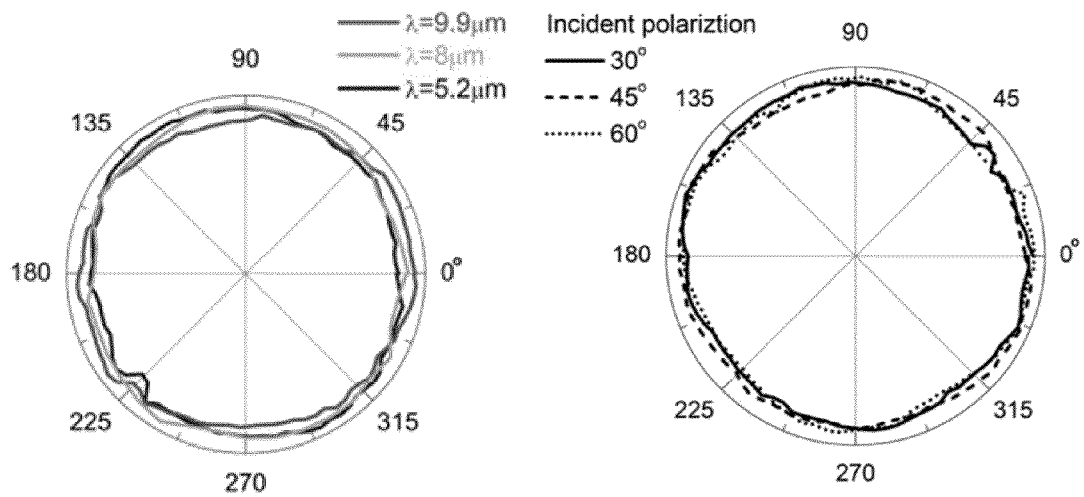
FIG. 53
FIG. 55

US 8,848,273 B2

AMPLITUDE, PHASE AND POLARIZATION PLATE FOR PHOTONICS

RELATED APPLICATIONS

This application is a continuation-in-part of PCT Application No. US2012/53434, filed 31 Aug. 2012, the entire contents of which are incorporated herein by reference. This application also claims the benefit of U.S. Provisional Application No. 61/529,353, filed 31 Aug. 2011, the entire content of which is incorporated herein by reference.

BACKGROUND

A light wavefront can be shaped by optical components, such as lenses and prisms, as well as diffractive elements, such as gratings and holograms, relying on gradual phase changes accumulated along the optical path. This approach is generalized in transformation optics, which utilizes metamaterials to bend light in unusual ways, achieving such phenomena as negative refraction, sub-wavelength-focusing, and cloaking.

SUMMARY

An optical plate for modulating the amplitude, phase, and/or polarization of radiation (e.g., light and radiation with other wavelengths) and methods for its fabrication and use are described herein. Various embodiments of the apparatus and methods may include some or all of the elements, features and steps described below.

An optical plate of this disclosure includes a substrate and a resonator structure comprising an array of multi-resonance resonators (i.e., resonators that resonate at more than one wavelength) formed on or in the substrate, wherein the resonator structure produces an abrupt change in at least one of phase, amplitude and polarization of incident radiation. In a method for manipulating radiation, incident radiation is received on an optical plate including the resonator structure on the substrate; radiation is then reemitted from the resonator structure with a change in at least one of phase, amplitude and polarization in comparison with the incident radiation.

While conventional optical components rely on gradual phase shifts accumulated during light propagation to shape optical wavefronts, new degrees of freedom in optical design can be attained using the methods and apparatus described herein by introducing in the optical path abrupt phase changes over the scale of the wavelength of incident light. A two-dimensional array of optical resonators with spatially varying phase response and sub-wavelength size and separation can imprint an arbitrary distribution of such phase discontinuities (in general, abrupt changes on phase, amplitude and/or polarization) on the propagating wavefront. A linear phase variation on the interface between two media can lead to anomalously reflected and refracted beams in accordance with generalized Snell's laws that feature negative refraction and reflection, a modified critical angle for total internal reflection, and a critical angle of incidence above which the reflected beam becomes evanescent. Phase discontinuities enable wavefront engineering with unprecedented flexibility, which is promising for a wide variety of small-footprint planar optical components.

BRIEF DESCRIPTION OF THE DRAWINGS

FIGS. 11 and 12 plot analytically calculated amplitude and phase delay of the cross-polarized scattered light for V-antennas in the form of gold rods of various length, h, and with an angle between the rods, $\Delta$, at $\lambda_o=8$ µm; the four circles in FIGS. 11 and 12 indicate the values of h and $\Delta$ used in experiments.

FIG. 13 schematically shows a unit cell of a plasmonic interface formed of eight antennas spaced at sub-wavelength distance and designed to have equal scattering amplitudes and constant phase difference $\Delta\Phi=\pi/4$ between neighboring antennas.

FIG. 14 provides finite-difference time-domain (FDTD) simulations of the scattered electric field for the individual antennas composing the array of FIG. 13; plots show the cross-polarized scattered electric field (x-polarization) for y-polarized plane wave excitation at normal incidence from the silicon substrate (z-propagation).

FIG. 21 is a scanning electron microscope image of a plasmonic interface that creates an optical vortex; the plasmonic pattern has eight regions, each occupied by one constituent antenna of the eight-element set of FIG. 13, wherein the antennas are arranged to generate a phase shift that varies azimuthally from 0 to $2\pi$, thus producing a helicoidal scattered wavefront.

FIG. 22 is a magnified view of the center part of FIG. 21.

FIGS. 23 and 24 are, respectively, measured and calculated far-field intensity distributions of an optical vortex with topological charge, l=1.

FIGS. 25 and 26 are, respectively, measured and calculated spiral patterns created by the interference of the vortex beam and a co-propagating Gaussian beam.

FIGS. 27 and 28 are, respectively, measured and calculated interference patterns with a dislocated fringe created by the interference of the vortex beam and a Gaussian beam when the two beams are tilted with respect to each other.

FIG. 32 is an illustration of a flat lens having a hyperboloidal radial phase distribution, shown via the representative image of FIG. 33.

FIG. 34 is an illustration of an axicon having a conical radial phase distribution, shown via the representative image of FIG. 35.

FIG. 52 plots the calculated degree of circular polarization and intensity of the extraordinary beam as a function of wavelength.

FIG. 53 provides a state-of-polarization analyses for the extraordinary beam at $\lambda$=5.2, 8, and 9.9 µm for a metasurface quarter-wave plate.

FIG. 54 provides experimental far-field scans showing the ordinary and extraordinary beams generated by a metasurface quarter-wave plate at different incident polarizations.

FIG. 55 provides a state-of-polarization analyses for the extraordinary beam at three different incident polarizations for a metasurface quarter-wave plate.

Figure 1:
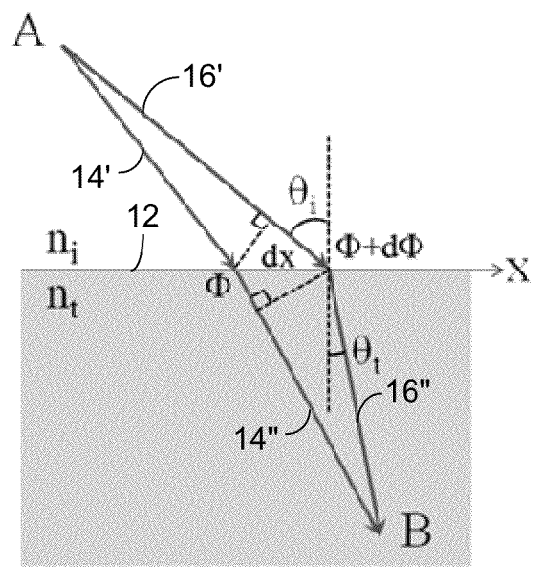
FIG. 1 provides schematics used to derive the generalized Snell's law of refraction.

In the accompanying drawings, like reference characters refer to the same or similar parts throughout the different views; and apostrophes are used to differentiate multiple instances of the same or similar items sharing the same reference numeral. The drawings are not necessarily to scale, emphasis instead being placed upon illustrating particular principles, discussed below.

DETAILED DESCRIPTION

The foregoing and other features and advantages of various aspects of the invention(s) will be apparent from the following, more-particular description of various concepts and specific embodiments within the broader bounds of the invention(s). Various aspects of the subject matter introduced above and discussed in greater detail below may be implemented in any of numerous ways, as the subject matter is not limited to any particular manner of implementation. Examples of specific implementations and applications are provided primarily for illustrative purposes.

Unless otherwise defined, used or characterized herein, terms that are used herein (including technical and scientific terms) are to be interpreted as having a meaning that is consistent with their accepted meaning in the context of the relevant art and are not to be interpreted in an idealized or overly formal sense unless expressly so defined herein. For example, if a particular composition is referenced, the composition may be substantially, though not perfectly pure, as practical and imperfect realities may apply; e.g., the potential presence of at least trace impurities (e.g., at less than 1 or 2%, wherein percentages or concentrations expressed herein can be either by weight or by volume) can be understood as being within the scope of the description; likewise, if a particular shape is referenced, the shape is intended to include imperfect variations from ideal shapes, e.g., due to manufacturing tolerances.

Although the terms, first, second, third, etc., may be used herein to describe various elements, these elements are not to be limited by these terms. These terms are simply used to distinguish one element from another. Thus, a first element, discussed below, could be termed a second element without departing from the teachings of the exemplary embodiments.

Spatially relative terms, such as "above," "below," "left," "right," "in front," "behind," and the like, may be used herein for ease of description to describe the relationship of one element to another element, as illustrated in the figures. It will be understood that the spatially relative terms, as well as the illustrated configurations, are intended to encompass different orientations of the apparatus in use or operation in addition to the orientations described herein and depicted in the figures. For example, if the apparatus in the figures is turned over, elements described as "below" or "beneath" other elements or features would then be oriented "above" the other elements or features. Thus, the exemplary term, "above," may encompass both an orientation of above and below. The apparatus may be otherwise oriented (e.g., rotated 90 degrees or at other orientations) and the spatially relative descriptors used herein interpreted accordingly.

Further still, in this disclosure, when an element is referred to as being "on," "connected to" or "coupled to" another element, it may be directly on, connected or coupled to the other element or intervening elements may be present unless otherwise specified.

The terminology used herein is for the purpose of describing particular embodiments and is not intended to be limiting of exemplary embodiments. As used herein, singular forms, such as "a" and "an," are intended to include the plural forms as well, unless the context indicates otherwise. Additionally, the terms, "includes," "including," "comprises" and "comprising," specify the presence of the stated elements or steps but do not preclude the presence or addition of one or more other elements or steps.

A new degree of freedom for controlling wavefronts can be attained by introducing abrupt phase shifts over the scale of the wavelength along the optical path, with the propagation of light governed by Fermat's principle. The latter states that the trajectory taken between two points, A and B, by a ray of light is that of least optical path, $\int_A^B n(\vec{r})dr$, where $n(\vec{r})$ is the local index of refraction, and readily gives the laws of reflection and refraction between two media. In its most general form, Fermat's principle can be stated as the principle of stationary phase; that is, the derivative of the phase, $\int_A^B d\phi(\vec{r})$, accumulated along the actual light path will be zero with respect to infinitesimal variations of the path. We show that an abrupt phase delay, $\Phi(\vec{r}_s)$, over the scale of the wavelength can be introduced in the optical path by suitably engineering the interface between two media; $\Phi(\vec{r}_s)$ depends on the coordinate, $\vec{r}_s$, along the interface. Then the total phase shift, $\Phi(\vec{r}_s)+\int_A^B \vec{k}\cdot d\vec{r}$, will be stationary for the actual path that light takes; $\vec{k}$ is the wavevector of the propagating light. This provides a generalization of the laws of reflection and refraction, which is applicable to a wide range of subwavelength structured interfaces between two media throughout the optical spectrum.

The introduction of an abrupt phase delay (also denoted herein as "phase discontinuity"), $\Phi$, at the interface 12 between two media allows us to revisit the laws of reflection and refraction by applying Fermat's principle (see FIG. 1). In FIG. 1, schematics used to derive the generalized Snell's law of refraction are illustrated. The interface 12 between the two media is artificially structured in order to introduce an abrupt phase shift, $\Phi$, along the light path, which is a function of the position along the interface 12. $\Phi$ and $\Phi+d\Phi$ are the phase shifts where the two rays 14 and 15 cross the boundary. The phase shift is generated over almost no distance (e.g., no more than a dimension of the plasmonic interface in the path of the incident radiation, which can be smaller than the wavelength of the incident radiation—for example, 50-60 nm).

Consider an incident plane wave 16' at an angle, $\theta_i$. Assuming that the two rays 14 and 16' in FIG. 1 are infinitesimally close to the actual light path, the phase difference between them, as expressed in the following equation, is zero:

$$[k_o n_i \sin(\theta_i)dx+(\Phi+d\Phi)]-[k_o n_t \sin(\theta_t)dx+\Phi]=0, \quad (1)$$

where $\Phi$ and $\Phi+d\Phi$ are, respectively, the phase discontinuities at the locations where the two paths 14 and 16 cross the interface; dx is the distance between the crossing points; $n_i$ and $n_t$ are the refractive indices of the two media; and $\theta_t$ is the angle of refraction. If the phase gradient along the interface is designed to be constant, the previous equation leads to the generalized Snell's law of refraction, as follows:

$$\sin(\theta_t)n_t - \sin(\theta_i)n_i = \frac{\lambda_o}{2\pi}\frac{d\Phi}{dx}. \quad (2)$$

Equation (2) implies that the refracted ray 16" can have an arbitrary direction, provided that a suitable constant gradient of phase discontinuity along the interface (d$\Phi$/dx) is introduced. Note that because of the non-zero phase gradient in this modified Snell's law, the two angles of incidence±$\theta_i$ lead to different values for the angle of refraction. As a consequence, there are two possible critical angles for total internal reflection:

$$\theta_c = \arcsin\left(\pm\frac{n_t}{n_i} - \frac{\lambda_o}{2\pi n_i}\frac{d\Phi}{dx}\right). \quad (3)$$

Similar to Eq. (2), for the reflected light, we have the following:

$$\sin(\theta_r) - \sin(\theta_i) = \frac{\lambda_o}{2\pi n_i}\frac{d\Phi}{dx}, \quad (4)$$

where $\theta_r$ is the angle of reflection. Note the nonlinear relation between $\theta_r$ and $\theta_i$, which is markedly different from conventional specular reflection. Equation (4) predicts that there is always a critical incidence angle, $\theta'_c$, calculated as follows:

$$\theta'_c = \arcsin\left(1 - \frac{\lambda_o}{2\pi n_i}\left|\frac{d\Phi}{dx}\right|\right), \quad (5)$$

above which the reflected beam becomes evanescent.

In the above derivation, $\Phi(x)$ is assumed to be a continuous function of the position along the interface 12; thus, all the incident energy is transferred into the anomalous reflection and refraction. However, since an array of optical resonators 24 with sub-wavelength separation is used experimentally to achieve the phase change along the interface, this discreteness implies that there is also regular reflection and refraction, as confirmed by our experiments and simulations. The separation between the resonators 24 controls the relative amount of energy in the anomalous refracted and reflected beams. The array is optically thin to achieve the abrupt phase variation as light traverses the interface.

The phase shift between the emitted and the incident radiation (e.g., from a laser) of an optical resonator 24 changes significantly across a resonance. By spatially tailoring the geometry of the resonators 24 in the array and hence their frequency response, one can design the phase shift along the interface, $\Phi(x)$, and mold the wavefront of the reflected and refracted beams in nearly arbitrary ways. The choice of the resonators 24 is potentially wide-ranging, including electromagnetic cavities, apertures, quantum dots, nanoparticle clusters and plasmonic antennas. Any optical element with resonance and emission of radiation can be used as the resonator 24. Particular concentration is focused herein on plasmonic antennas due to the widely tailorable optical properties of plasmonic antennas (also referred to as emitters or resonators) and the ease of fabricating planar antennas of nanoscale thickness, though other types of resonators can alternatively or additionally be similarly incorporated into the apparatus and methods described herein. The plasmonic antennas 24 can be formed of metal, such as gold, silver and aluminum, or of heavily doped semiconductors, such as gallium arsenide and silicon.

Figure 4:
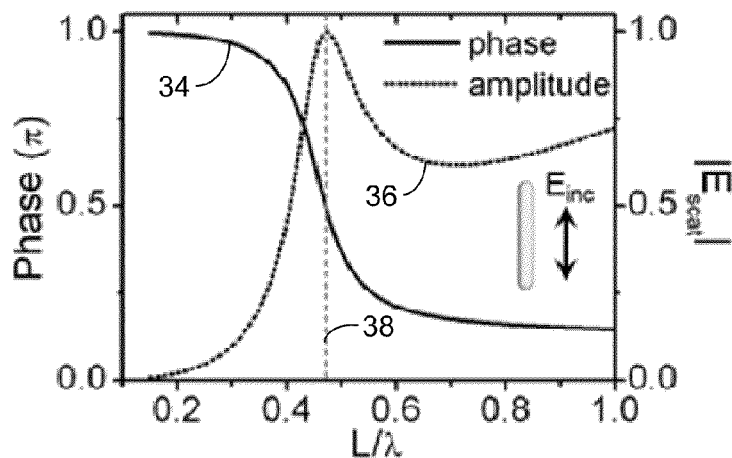
FIG. 4 plots the calculated phase and amplitude of scattered light from a straight rod antenna made of a perfect electric conductor, where the vertical dashed line indicates the first-order dipolar resonance of the antenna.

The plasmonic antenna 24 absorbs incident radiation (e.g., in the visible light wavelength range of about 380 to 750 nm or above or below this range), resonates and then reemits radiation with a shift in phase, and/or with modified amplitude and polarization. In various embodiments, a single-rod antenna can introduce a phase delay from 0 to $\pi$ as a function of incident wavelength or rod length, where the phase delay decreases with decreasing wavelength or increasing rod length (FIG. 4). Similarly the amplitude of the reemitted radiation varies as a function of wavelength (or rod length) with a bell-curve distribution peaking around a phase shift of $\pi/2$.

Figure 2:
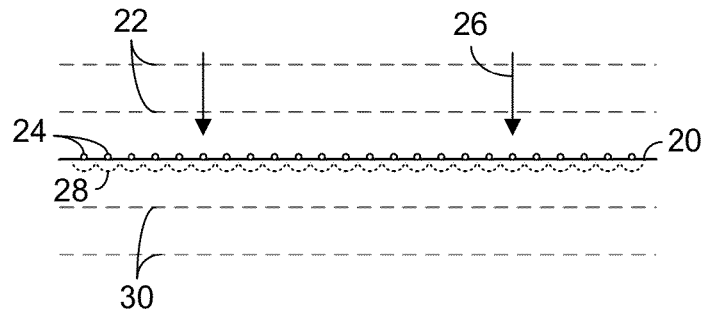
FIG. 2 is a side view showing a substrate with a series of identical plasmonic antennas on a substrate with incident and reemitted light.

Light propagation through a phase plate 20 including a string of identical plasmonic antennas 24 is shown in FIG. 2. The wavefronts 22 of the incident light are parallel to the plane of the substantially planar substrate (plate) 20 on which the plasmonic antennas 24 are mounted and the incident light propagates in the direction shown by the arrow 26. The substrate 20 is formed of a material that is transparent at the operating wavelength of the incident radiation—for example, silica glass or of a silicon wafer; and the substrate can have a thickness no greater than is necessary to provide support (e.g., 0.1 to 5 mm). The plasmonic antennas 24 each absorb the incident light 22, resonate, and reemit light. The wavefronts 28 of the reemitted light are shown as arcs in FIG. 2. Because the antennas 24 are identical (or substantially identical), the reemission from each antenna 24 is identical or substantially identical (e.g., same phase, amplitude and polarization) to the reemissions from the other antennas 24. Therefore, the aggregate wavefront 30 of the reemission from the antenna array, which is the envelope of the reemissions from all the antennas, is parallel to the plane of the plate 20.

Figure 3:
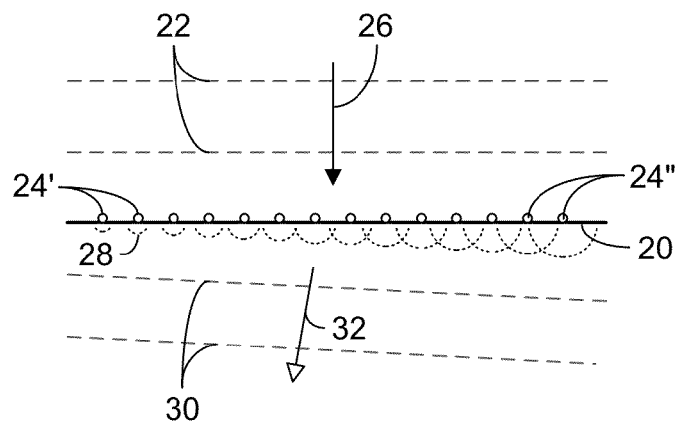
FIG. 3 side view showing a planar lens in the form of a substrate with a series of plasmonic antennas having increasingly fast delay times from left to right on a substrate with incident and anomalously refracted light.

Because the antennas 24 are individually tailorable, however, the antennas 24 can have different properties (e.g., size, geometry or orientation)—e.g., with differences greater than typical manufacturing tolerances, such as differences of at least 5%—to produce reemitted light with different properties (e.g., differences in phase change). A plasmonic interface consisting of an array of antennas 24 that can create a tilted wavefront 30 with a normal incident excitation is shown in FIG. 3. In this embodiment, the antennas 24" on the right side offer a smaller phase delay compared to the antennas 24' on the left. This difference can be achieved, for example, by choosing antennas 24 of different lengths. Accordingly, the angle 32 of the wavefront 30 of the reemitted light is tilted so that the light is reemitted away from the normal to the substrate 20, though the incident light 26 normally impinges on the substrate 20. Additionally, some light will pass through the substrate 20 without interacting with a plasmonic antenna 24, so there will be a portion of the incident light 26 passing straight through the substrate 20 without being redirected and thus satisfy the standard Snell's law.

Phase shifts covering the 0-to-$2\pi$ range are needed to provide full control of the reemission wavefront 30. The phase shift associated with the resonances of a single rod antenna cannot exceed $\pi$ (as shown in FIG. 4) and, therefore, is not suitable for full control of the signal. The plots of FIG. 4 represent the calculated phase 34 and amplitude 36 of scattered light from a straight-rod antenna made of a perfect electric conductor, wherein the vertical dashed line 38 indicates the first-order dipolar resonance of the antenna.

To realize phase discontinuities (so-named because they drastically alter the phase over a sub-wavelength region of space), one can use V-shaped plasmonic antennas 24 (as shown in FIGS. 5, 6, 8, and 9), though antennas with other shapes can be used, such as Y-shaped and crossed-shaped antennas. The phase shift between the emitted and the incident radiation of an optical antenna 24 changes significantly across its resonances. By spatially tailoring the geometry of these antennas 24 in the array and, hence, their frequency response, one can design the phase shift along the interface 12 and mold the wavefront of the reflected and refracted beams in nearly arbitrary ways, where the reflection or refraction angle is not dependent on the incident angle. The specially designed V-antennas, described herein, can be engineered to scatter light with any desired phase and amplitude just by varying some basic geometrical parameters (as shown in the charts of FIGS. 11 and 12).

Figure 7:
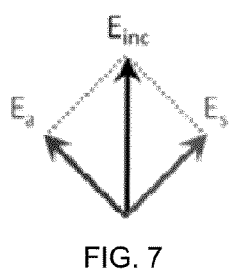
As shown in FIG. 7, the symmetric and anti-symmetric modes are excited, respectively, by components of the incident field along ŝ and â axes, where the angle between the incident polarization and the antenna symmetry axis is 45°, and where the direction of current flow is indicated by arrows.
Figure 10:
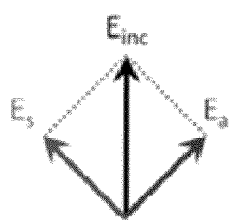
Figure 5:
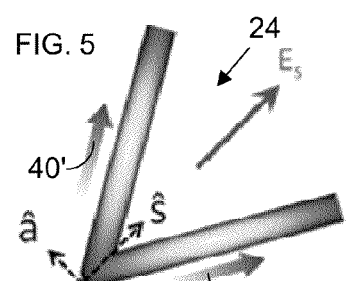
FIGS. 5 and 6 illustrate a V-antenna that supports symmetric and anti-symmetric modes.
Figure 8:
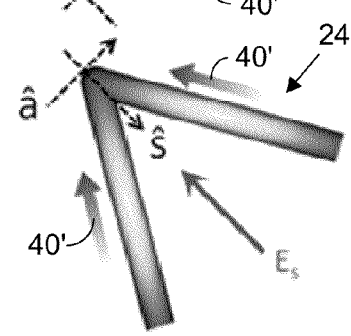
FIGS. 8 and 9 illustrate a V-antenna corresponding to a mirror image of the antenna in FIGS. 5 and 6, wherein the symmetric mode is shown in FIG. 8, and wherein the anti-symmetric mode is shown in FIG. 9; the components of the scattered electric field perpendicular to the incident field in FIGS. 5-10 have a $\pi$ phase difference.
Figure 6:
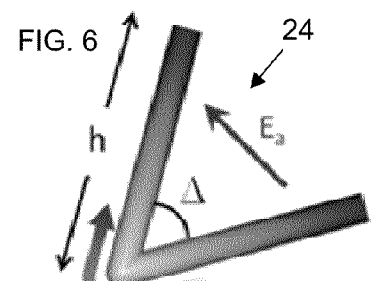
Figure 9:
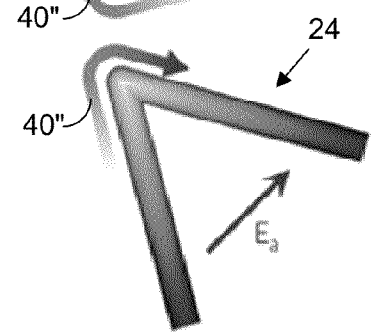

To achieve the phase coverage of $2\pi$, the scattering properties of V-shaped antennas 24, which include two arms of equal length, h, connected at one end of each at an angle, $\Delta$ (as shown in FIGS. 5 and 6), are used. Two unit vectors, ŝ and â, are defined to describe the orientation of a V-antenna (with one orientation shown in FIGS. 5 and 6 and another orientation shown in FIGS. 8 and 9); ŝ is oriented along the symmetry axis of the antenna, and â is oriented such that ŝ·â=0 (see FIGS. 5 and 8). V-antennas support "symmetric" (see FIGS. 5 and 8) and "anti-symmetric" (see FIGS. 6 and 9) modes, which are excited by electric-field components along ŝ and â axes, respectively (as shown in FIGS. 7 and 10). The angle between the incident polarization and the antenna symmetry axis, ŝ, is 45°. The schematic current distribution in the antennas 24 is represented by shading, with lighter shading representing larger currents. The direction of current flow is indicated by arrows 40 with shading gradient.

In the symmetric mode (shown in FIGS. 5 and 8), the current distribution in each arm of the antenna 24 approximates that of an individual straight antenna of length, h; and, therefore, the first-order antenna resonance occurs at $h \approx \lambda_o/2$. In the anti-symmetric mode, the current distribution in each arm (shown in FIGS. 6 and 9) approximates that of one half of a straight antenna of length, 2h. Therefore, the condition for the first-order resonance of this mode is $2h \lambda_o/2$.

The polarization of the scattered radiation is the same as that of the incident light when the latter is polarized along ŝ or â. For an arbitrary incident polarization, both antenna modes are excited but with substantially different amplitude and phase due to their distinctive resonance conditions. As a result, the scattered light can have a polarization different from that of the incident light. These modal properties of the V-antennas allow one to design the amplitude, phase, and polarization state of the scattered light. The incident polarization was set to be at 45° with respect to s and a so that both the symmetric and anti-symmetric modes can be excited and to provide the scattered light with a significant component polarized orthogonal to that of the incident light. Experimentally, this configuration allows the use of a polarizer to decouple the scattered light from the excitation.

As a result of the modal properties of the V-antennas 24 and the degrees of freedom in choosing antenna geometry (h and $\Delta$), the cross-polarized scattered light can have a large range of phases and amplitudes for a given wavelength, $\lambda_o$; see FIGS. 11 and 12 for analytical calculations of the amplitude and phase response of V-antennas assumed to be made of gold rods of various lengths, h, and juncture angles, $\Delta$, at $\lambda_o=8$ μm. The rod lengths, h, can be established based on the wavelength, $\lambda_i$, of the incident radiation; for example, h can be in the range from $\lambda_i/10$ to $\lambda_i/15$; in particular embodiments, the rod length, h, may be, for example, no greater than 1 μm. In FIG. 11, the upper 42 and lower 44 dashed curves correspond to the resonance peaks of the symmetric and anti-symmetric modes, respectively. As shown by the shading in FIG. 12, shorter rod lengths, h, generally produced more positive degrees of phase delay. Four antennas 24 detuned from the resonance peaks, as indicated by circles 46 in FIGS. 11 and 12, with the indicated values of h and $\Delta$ were chosen, providing an incremental phase of $\pi/4$ from left to right for the cross-polarized scattered light. By simply taking the mirror structure (FIGS. 8 and 9) of an existing antenna (FIGS. 5 and 6), one creates a new antenna whose cross-polarized emission has an additional $\pi$ phase shift. This is evident by observing that the currents leading to cross-polarized radiation are it out of phase in FIGS. 7 and 10. A unit cell 25 of eight antennas 24 were thus created from the initial four antennas, as shown in FIG. 13.

Full-wave finite-difference time-domain (FDTD) simulations of the scattered electric field for the individual antennas 24 confirm that the amplitudes of the cross-polarized radiation scattered by the eight antennas 24 are nearly equal with phases in $\pi/4$ increments, as shown in FIG. 14), where the plots show the cross-polarized scattered electric field (x-polarization) for y-polarized plane wave excitation at normal incidence from the silicon substrate (z-propagation). The silicon substrate 20 is located at $z \leq 0$. The antennas 24 are equally spaced at a sub-wavelength separation, $\Gamma/8$, where $\Gamma$ is the unit cell length. For example, the separation between antennas 24 can be $\frac{1}{10}$th of the wavelength of the incident radiation. The tilted straight line 48 in FIG. 13 is the envelope of the projection on the x-z plane of the spherical waves scattered by the antennas 24 of the plasmonic interface. On account of Huygens's principle, the far-field of the cross-polarized refracted radiation resulting from the superposition of the waves scattered by the antennas is a plane wave that satisfies the generalized Snell's law (Eq. 2) with a phase gradient along the interface, $|d\Phi/dx|=2\pi/\Gamma$.

The generalized laws of reflection and refraction were experimentally demonstrated using plasmonic interfaces constructed by periodically arranging the eight constituent antennas 24, shown in FIG. 13. The spacing between the antennas 24 is sub-wavelength to provide efficient scattering and to prevent the occurrence of grating diffraction, though at or above a sufficient distance to prevent the strong near-field coupling between neighboring antennas 24 that may perturb the designed scattering amplitudes and phases. The antennas 24 are designed to have equal scattering amplitudes and constant phase difference, $\Delta\Phi=\pi/4$, between neighboring antennas. A representative sample of an antenna array fabricated with dense packing on a silicon wafer is shown within the box in the scanning-electron-microscope image of FIG. 15, where $\Gamma$ is the lateral period of the antenna array. The unit cell 25 (highlighted) of the plasmonic interface comprises eight gold V-antennas 24 with a width of about 220 nm and a thickness of about 50 nm, and it repeats with a periodicity of $\Gamma=11$ μm in the x direction and 1.5 μm in the y direction. The antenna array can be fabricated, e.g., by electron beam lithography, imprint lithography or by focused ion beam milling.

Figure 15:
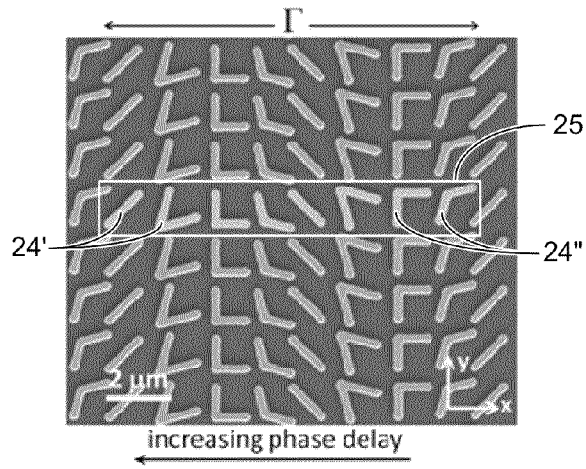
FIG. 15 is a scanning electron microscope image of a representative antenna array fabricated on a silicon wafer; the unit cell of the plasmonic interface comprises eight gold V-antennas, as shown in FIG. 13.
Figure 16:
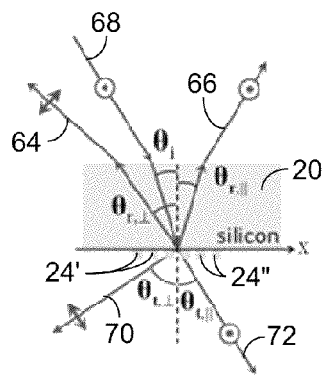
FIG. 16 is a schematic illustration of an experimental setup for y-polarized excitation (with an electric field normal to the plane of incidence).

A schematic of the experimental setup for y-polarized excitation (where the electric field is normal to the plane of incidence) is shown in FIG. 16, wherein y-polarized incidence light 68 from a collimated quantum cascade laser ($\lambda_0=8$ μm) is directed through a silicon substrate 20 with antennas 24, producing both anomalous 64 and ordinary 66 reflection as well as both anomalous 70 and ordinary refraction 72. The cross-polarized scattered light from the antennas 24' on the left-hand side of the unit cell 25 in FIG. 15 is phase delayed compared to scattered light from the antennas 24" on the right side. By substituting into Eq. (2) $-2\pi/\Gamma$ for $d\Phi/dx$ and the refractive indices of silicon and air ($n_{Si}$ and 1) for $n_i$ and $n_t$, the angle of refraction, $\theta_{t,\perp}$, is obtained for the cross-polarized light, as follows:

$$\theta_{t,\perp} = \arcsin[n_{Si}\sin(\theta_i)-\lambda_o/\Gamma]. \qquad (6)$$

Figure 17:
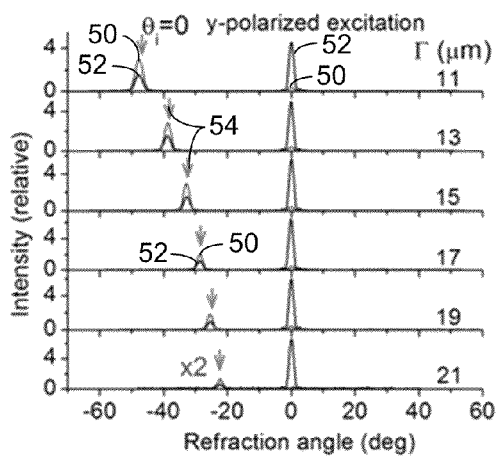
FIGS. 17 and 18 plot measured far-field intensity profiles of the refracted beams for y- and x-polarized excitations, respectively, where refraction angle is counted from the normal to the surface, and the curves 50 and 52 are measured with and without a polarizer, respectively, for six samples with different unit cell length, $\Gamma$; the amplitude of the curves 50 is magnified by a factor of two for clarity, and the arrows 54 indicate the calculated angles of anomalous refraction.
Figure 18:
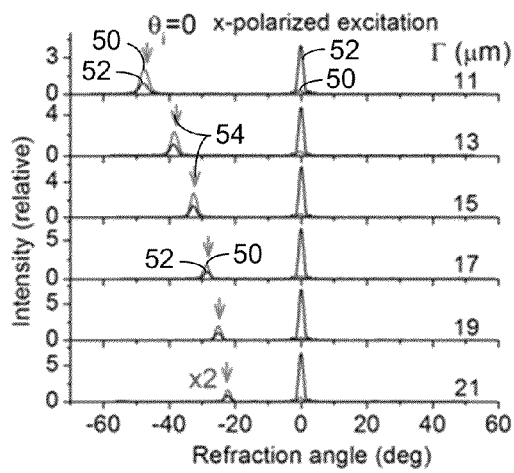

FIGS. 17 and 18 plot the measured far-field profiles of the refracted beams for y- and x-polarized excitations, respectively. The refraction angle is counted from the normal to the surface. Curves 50 and curves 52 are measured with and without a polarizer, respectively, for six samples with different unit cell length, $\Gamma$. The amplitude of curves 50 is magnified by a factor of two (raising the curves 50 above the curves 52 at the refraction angles away from zero) for clarity. The arrows 54 indicate the calculated angles of anomalous refraction according to Eq. (6).

FIG. 17 summarizes the experimental results of the ordinary and the anomalous refraction for six samples with different unit cell lengths, Γ, at normal incidence. The incident polarization is along the y-axis in the orientation shown in FIG. 15. The sample with the smallest Γ corresponds to the largest phase gradient and the most efficient light scattering into the cross-polarized beams. The observed angles of anomalous refraction (as shown in FIG. 17) agree well with the theoretical predictions of Eq. (6). In FIG. 18, the same peak positions were observed for normal incidence with polarization along the x-axis in the orientation shown in FIG. 15. To a good approximation, we expect that the V-antennas were operating independently at the packing density used in the experiments. Using a large antenna array (with dimensions of about 230 μm×about 230 μm) accommodates the size of the plane-wave-like excitation (with a beam radius of about 100 μm). The periodic antenna arrangement is used here for convenience but is not necessary to satisfy the generalized Snell's law. The phase increments between nearest neighbors do not need to be constant if one relaxes the unnecessary constraint of equal spacing between nearest antennas 24.

Figure 19:
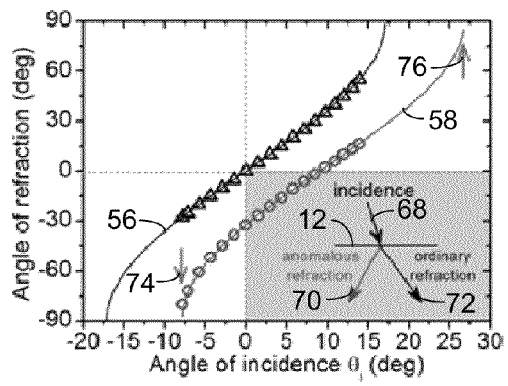
FIG. 19 plots angle of refraction versus angle of incidence for the ordinary (curve 56 and triangles) and anomalous refraction (curve 58 and circles) for a sample with $\Gamma=15$ µm; the shaded region represents "negative" refraction for the cross-polarized light, as illustrated in the inset, and the arrows indicate the critical angles for total internal reflection.

FIG. 19 shows the angle of refraction as a function of the angle of incidence, $\theta_i$, for both the silicon-air interface (curve 56 and triangles) producing ordinary refraction and the plasmonic interface (curve 58 and circles) producing anomalous refraction for a sample with Γ =15 μm. The curves 56 and 58 are theoretical calculations using the generalized Snell's law for refraction (Eq. (2)) and the symbols are experimental values extracted from refraction measurements on beams 72 and 70 (as shown in FIG. 16) as a function of incidence angle.

Figure 20:
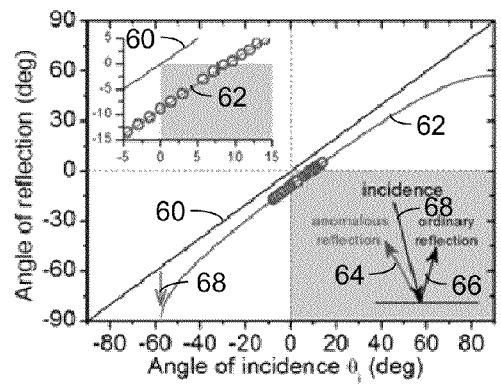
FIG. 20 plots angle of reflection versus angle of incidence for the ordinary curve 60 and anomalous curve 62 (and circles) reflection for a sample with $\Gamma=15$ µm, where the upper left inset is a magnified view; the shaded region represents "negative" reflection for the cross-polarized light as illustrated in the lower right inset, and the arrow indicates the critical incidence angle above which the reflected beam becomes evanescent.

FIG. 20 shows the angle of reflection versus angle of incidence for the ordinary reflection (line 60) and anomalous reflection (curve 62 and circles) for the sample with Γ =15 μm. The upper left inset is a magnified view of a central region of the chart. The curves 60 and 62 were generated from theoretical calculations using Eq. (4), and the symbols are experimental values extracted from the angular positions of beam 64 (as shown in FIG. 16) as a function of the incidence angle, $\theta_i$. The shaded region represents "negative" reflection 64 for the cross-polarized light (compared with ordinary reflection 66), as illustrated in the lower right inset. The arrow indicates the critical incidence angle above which the reflected beam becomes evanescent.

In the range of $\theta_i \approx$ 0-9 degrees (in the shaded region of FIGS. 19 and 20), the plasmonic interface exhibits "negative" refraction 70 and reflection 64 for the cross-polarized scattered light, as illustrated in the schematics shown in the lower right insets of FIGS. 19 and 20. Note that the critical angle for total internal reflection is modified to be about −8 and +27 degrees (arrows 74 and 76 in FIG. 19) for the plasmonic interface in accordance with Eq. (3) compared to ±17 degrees for the silicon-air; the anomalous reflection does not exist for $\theta_i$ beyond −57 degrees (arrow 78 in FIG. 20).

At normal incidence, the ratio, $R_1$, of intensity between the anomalous (beam 70) and ordinary refraction (beam 72) is about 0.32 (FIG. 17); and the ratio, $R_2$, between the anomalous reflection (beam 64) and ordinary refraction (beam 72) is about 0.55 for the sample with Γ =15 μm. Note that $R_1$ and $R_2$ strongly depend on the angle of incidence. For example, at $\theta_i$=12°, $R_1 \approx$0.52 and $R_2 \approx$1.08, indicating efficient scattering into anomalous refraction and reflection.

To demonstrate the versatility of the concept of interfacial phase discontinuities, a plasmonic interface capable of creating a vortex beam upon illumination by normally incident linearly polarized light was fabricated. A vortex beam has a helicoidal (or "corkscrew-shaped") equal-phase wavefront. Specifically, the beam has an azimuthal phase dependence, exp(ilφ), with respect to the beam axis and carries an orbital angular momentum of L=lℏ per photon, where the topological charge, l, is an integer, indicating the number of twists of the wavefront within one wavelength; ℏ is the reduced Planck constant. These peculiar states of light are commonly generated using a spiral phase plate or using a computer-generated hologram and can be used to rotate particles or to encode information in optical communication systems.

The plasmonic interface was created by arranging the eight constituent antennas as shown in FIG. 21, which is a scanning-electron-microscope image of a plasmonic interface that creates an optical vortex. The plasmonic pattern has eight regions, each occupied by one constituent antenna 24 of the eight-element unit cell 25 of FIG. 13. The antennas 24 are arranged to generate a phase shift that varies azimuthally from 0 to 2π, thus producing a helicoidal scattered wavefront. FIG. 22 provides a magnified view of the center part of FIG. 21.

The interface introduces a spiral-like phase delay with respect to the planar wavefront of the incident light, thereby creating a vortex beam with l=1. FIGS. 23 and 24 are, respectively, measured and calculated far-field intensity distributions of an optical vortex with topological charge, l=1. The vortex beam had an annular intensity distribution in the cross-section, as viewed in the mid-infrared camera image of FIG. 23; the dark region at the center corresponds to a phase singularity, and the constant background in FIG. 23 is due to the thermal radiation.

FIGS. 25 and 26 are, respectively, measured and calculated spiral patterns created by the interference of the vortex beam and a co-propagating Gaussian beam. The spiral wavefront of the vortex beam can be revealed by interfering the beam with a co-propagating Gaussian beam, producing a spiral interference pattern, as shown in FIG. 25.

Figure 29:
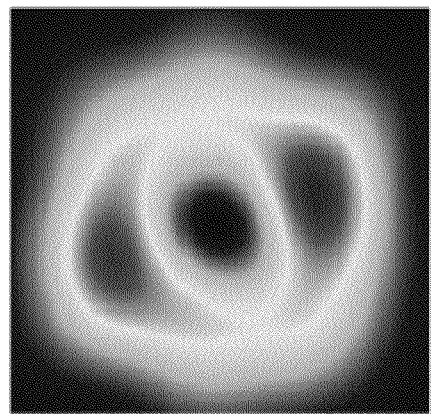
FIG. 29 is a finite-difference time-domain (FDTD) simulation of a meso-field intensity profile just $1\lambda$ from the interface for the sample shown in FIG. 21.

Alternatively, the topological charge, l=1, can be identified by a dislocated interference fringe when the vortex and Gaussian beams interfere with a small angle; FIGS. 27 and 28 are, respectively, measured and calculated interference patterns with a dislocated fringe created by the interference of the vortex beam and a Gaussian beam when the two beams are tilted with respect to each other. The circular border of the interference pattern in FIG. 27 arises from the finite aperture of the beam splitter used to combine the vortex and the Gaussian beams. The annular intensity distribution and the interference patterns were well reproduced in simulations (see, e.g., FIGS. 24, 26, and 28) by using the calculated amplitude and phase responses of the V-antennas, which can be derived from FIGS. 11 and 12. Finally, FIG. 29 shows a finite-difference time-domain (FDTD) simulation of the meso-field intensity profile just 1λ from the interface.

Figure 30:
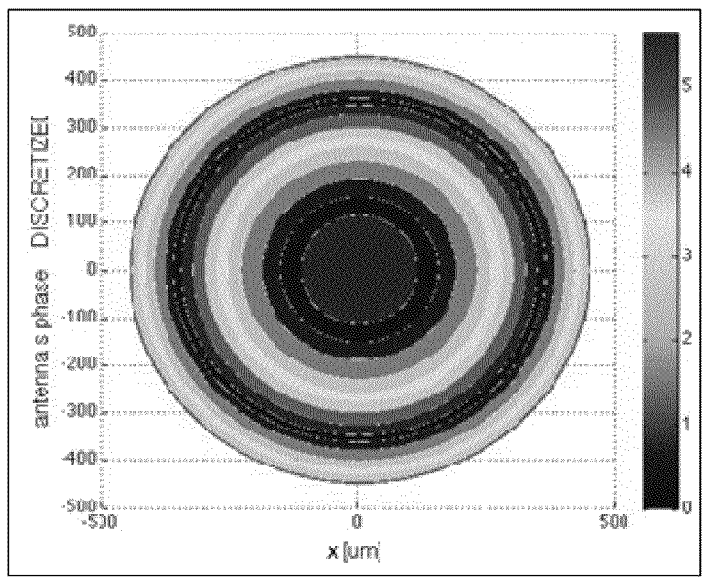
FIG. 30 is a near-field phase profile for a ~1-mm-diameter focusing planar lens.
Figure 31:
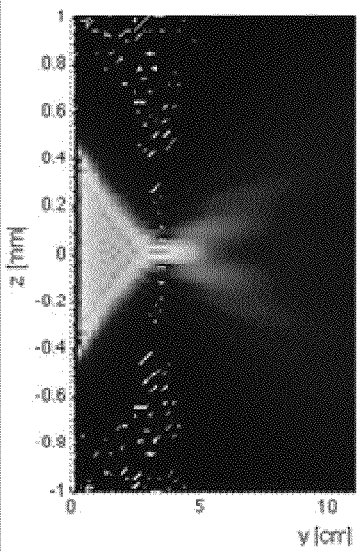
FIG. 31 is a cut-away of the resulting calculated intensity profile showing the focusing behavior of the planar lens.

By replacing the azimuthal phase dependence of the vortex plate in FIG. 21, with a radial dependence, planar lenses can be formed that produce, e.g., a near-field phase profile, as shown in FIGS. 30 and 31. As with the vortex plate, the planar lens directly imprints the proper phase profile on the incident beam. FIG. 30 shows preliminary calculations for the design of a low numerical aperture (NA) lens (showing the near-field profile of a ~1-mm-diameter planar lens). FIG. 31 provides a cut-away view of the resulting calculated intensity profile showing focusing behavior. The lens is intentionally designed to have a low NA (0.13) for ease of experimental demonstration, but very high NA values are also possible. Furthermore, since the sub-wavelength phase elements can be individually tailored, the lensing functionality can be integrated with other functionalities in one device plane, enabling, for example, a combined lens/vortex plate.

In other embodiments, the plasmonic interface can be designed to be dynamically adjustable in terms of how it alters phase, amplitude, and/or polarization. In one embodiment, a plasmonic antenna includes or is in contact with a material that has an optical constant that can be tuned by external signal. For example, the material can be a doped semiconductor or a phase transition material, such as $VO_2$ (vanadium dioxide). For example, the substrate on or in which the plasmonic antennas are mounted can be a semiconductor (e.g., silicon doped with boron or phosphorous). In another embodiment, the semiconductor can form the junction of the V-shaped antenna with the resonator rods attached thereto. By, e.g., applying an external signal to the semiconductor, such as light, voltage, magnetic field or elastic strain, the optical properties of the plasmonic antenna can be altered.

In conclusion, a plasmonic interface formed of an array of V-antennas provides abrupt phase shifts in the optical path, leading to molding of the optical wavefront over sub-wavelength distances. This design breaks the constraint of standard optical components, which rely on gradual phase accumulation along the optical path to change the wavefront of propagating light. Anomalous refraction and reflection at the interface that satisfy a powerful generalization of Snell's laws, in terms of the phase discontinuity gradient along the interface, have been demonstrated. Additionally, a plasmonic interface has been utilized to generate optical vortices that have a helicoidal wavefront and that carry orbital angular momentum. The design strategies presented herein allow one to tailor in an almost arbitrary way the phase and amplitude of an optical wavefront, which offers substantial advantages for transformation optics and integrated optics.

Accordingly, a variety of novel planar optical components, such as phased antenna arrays in the optical domain, planar lenses, polarization converters, perfect absorbers, and spatial lightwave modulators, may be produced from these designs. In particular embodiments (e.g., such as the embodiment shown in FIG. 21) the plasmonic interface can impart left and/or right optical angular momentum, which can be interpreted as (or converted into) "0" and "1" states for optical communication. In other embodiments, the plasmonic interface can be used to focus sunlight coming from a large range of incident angles on a photovoltaic solar panel. In still other embodiments, the plasmonic interface can be used as an ultra-thin lens with a high numerical aperture in a camera. The lens can be designed to form images on a planar surface instead of on a curved surface like what occurs in a conventional lens with a large numerical aperture. Further still, the plasmonic interface can be used in communication devices, where the interface manipulates radiation signals before or as they are transmitted, e.g., in free space or via a waveguide.

In another embodiment, the optical plate (lens) can be incorporated into one or both facets of an optical fiber. For example, the antennas (resonators) can be positioned on or incorporated into the input and/or output facets at opposite ends of the optical fiber. When positioned at the output facet of the fiber, the optical plate can enable, for example, new stetoscopes and surgery applications. Additionally, an optical fiber with incorporated antennas of this disclosure can be used in telecommunication applications—e.g., replacing the input lens and thereby offering a natural self-alignment solution.

In additional embodiments, a plurality of the optical plates are stacked together in direct contact or in close proximity (e.g., separated by no more than 1 mm or less) or a plurality of resonator layers can be provided on/in the substrate. Accordingly, multiple layers of resonators can be provided in an optical device, either in the form of a plurality of stacked plates or in a unitary monolithic structure including multiple resonator layers. Each of the layers of resonators can have the same or different configuration of resonators as the other layers.

Accordingly, multiple resonator layers can be employed to form composite devices that otherwise typically require multiple lenses. Particular examples include optical microscopes and telescopes, both of which are typically formed in the simplest configuration by two lenses, one called the "ocular" (or eyepiece) and the other called the "objective", which, in typical previous designs, must be properly spaced. Using the multi-layers of resonators described above, however, the functions of the two lenses can be incorporated into a single lens (with multiple layers of resonators) or into two flat lenses that are either in direct contact or more closely spaced.

Additionally, the multiple layers of resonators can be provided to provide for potential interference effects. For example, multiple layers of resonators can be employed to produce a new version of the classical and ubiquitous interference structure known as Distributed Bragg Reflector (DBR). The layers of a classical DBR must have a certain thickness to make sure that waves reflected/refracted by successive interfaces have proper relative phase between each other. Since the resonator structures described herein allow manipulation of the phase at the interfaces, a DBR that includes layers of these resonator structures can be produced with different layer thickness and yet still work properly due to the compensation provided by the phase of the resonators.

A third reason for including multilayers or resonator structures can be for reinforcing the effect; e.g., putting two lens structures one after the other may provide better focusing. Another reason can be to manipulate properties such as polarization; for example, if the first plate rotates the polarization, the second plate can further rotate the polarization or restore the original polarization.

Flat Lens and Axicon Embodiments

In additional embodiments, the above-described means for producing optical phase discontinuities can be employed in aberration-free ultra-thin flat (planar) lenses and axicons, wherein the discontinuities are produced by a phased array of ultra-thin sub-wavelength spaced optical antennas. The lenses and axicons can include a radial distribution of V-shaped nano-scale antennas that generate respectively spherical wavefronts and non-diffracting Bessel beams at wavelengths used in the telecommunications industry. Simulations also show that these aberration-free designs can be employed in high numerical aperture lenses, such as flat microscope objectives.

Axicons are conical shaped lenses that can convert Gaussian beams into non-diffracting Bessel beams and can create hollow beams. Axicons can be employed to perform this conversion in many applications, such as telescopes, autocollimators, microscopes, laser surgery and optical trapping. Focusing diffracting plates can be used in designs for low-weight and small-volume lenses.

The concept of optical phase discontinuities, which can be used in metasurfaces capable of beaming light in directions characterized by generalized laws of reflection and refraction, provides a new path for designing flat lenses. In this approach, control of the wavefront no longer relies on the phase accumulated during the propagation of light, but is achieved via the phase shifts experienced by radiation as it scatters off the optically thin array of subwavelength-spaced resonators (i.e., spaced apart at intervals smaller than the wavelength of incident radiation) comprising the metasurface. Linear gradients of phase discontinuities lead to planar reflected and refracted wavefronts. On the other hand, nonlinear phase gradients lead to the formation of complex wavefronts such as helicoidal wavefronts, which characterize vortex beams.

FIGS. 32-35 are schematic illustrations showing the design of flat lenses 79 and axicons 81 used in experiments, described below. In order to focus a plane wave to a single point at distance, f, from the metasurface, a hyperboloidal phase profile is imparted onto the incident wavefront. As shown in FIG. 32, the phase shift at a point, $P_L$, on the surface of the lens 79 is proportional to the distance, $\overline{P_L S_L}$, where $S_L$ is the projection of $P_L$ onto the spherical surface of a radius equal to the focal length, f. The resulting hyperboloidal radial phase distribution on the flat lens 79 is shown in FIG. 33. As an alternative to a hyperboloidal phase distribution, other phase distributions, such as spherical or parabaloidal phase distributions can be used for the flat lens. They can all work properly under the condition of paraxial approximation.

The axicon 81 of FIG. 34 images a point source onto a line segment along the optical axis; the length of the segment is the depth of focus (DOF). The phase in point, $P_A$, on the flat axicon 81 is proportional to the distance, $\overline{P_A S_A}$, where $S_A$ is the projection of $P_A$ onto the surface of a cone with the apex at the intersection of the metasurface with the optical axis and base angle $$\beta = \tan^{-1}\left(\frac{r}{DOF}\right)$$

(r is the radius of the metasurface). The resulting conical radial phase distribution on the flat axicon 81 is shown in FIG. 35. The phase profiles for the flat lenses 79 and axicons 81 are implemented using V-shaped optical antennas.

We experimentally demonstrated light focusing in free space at telecom wavelength, λ=1.55 μm, using 60-nm-thick gold metasurfaces (antennas). Two flat lenses were fabricated with respective focal distances of 3 cm and 6 cm; additionally, a flat axicon was fabricated with an angle, β=0.5°, which corresponds to a glass plano-convex axicon with base angle 1° (see FIGS. 34 and 35). These experiments were in excellent agreement with numerical simulations.

Flat lens designs can be obtained by imposing a hyperboloidal phase profile on the metasurface. In this way, secondary waves emerging from the metasurface constructively interfere at the focal plane similar to the constructive interference of waves that emerge from conventional lenses. For a given focal length, f, the phase shift, $\phi_L$, imposed in every point, $P_L$ (x,y), on the flat lens satisfies the following equation (see FIG. 32):

$$\varphi_L(x, y) = \frac{2\pi}{\lambda}\overline{P_L S_L} = \frac{2\pi}{\lambda}\left(\sqrt{(x^2+y^2)+f^2} - f\right), \quad (7)$$

where λ is the wavelength in free space.

For an axicon with angle, β, the phase delay has to increase linearly with the distance from the center, creating a conical phase distribution. The phase shift, $\phi_A$, at every point, $P_A$ (x,y), satisfies the following equation (see FIG. 34):

$$\varphi_A(x, y) = \frac{2\pi}{\lambda}\overline{P_A S_A} = \frac{2\pi}{\lambda}\sqrt{(x^2+y^2)}\sin\beta. \quad (8)$$

Optical antennas with equal scattering amplitudes and phase coverage over the whole 2π range can be used in the design of flat lenses with a large range of focal distances. Following the above-described approach, we designed eight different plasmonic V-shaped antennas that scatter light in cross-polarization with relatively constant amplitudes and an incremental phase of π/4 between neighbors. In other embodiments, the sequence can include any of an arbitrary number of antennas in each sub-unit (covering the 2π phase range). Including more antennas in the series produces a finer phase resolution; the use of eight antennas per sequence in this embodiment provides a phase resolution of π/4.

Figure 36:
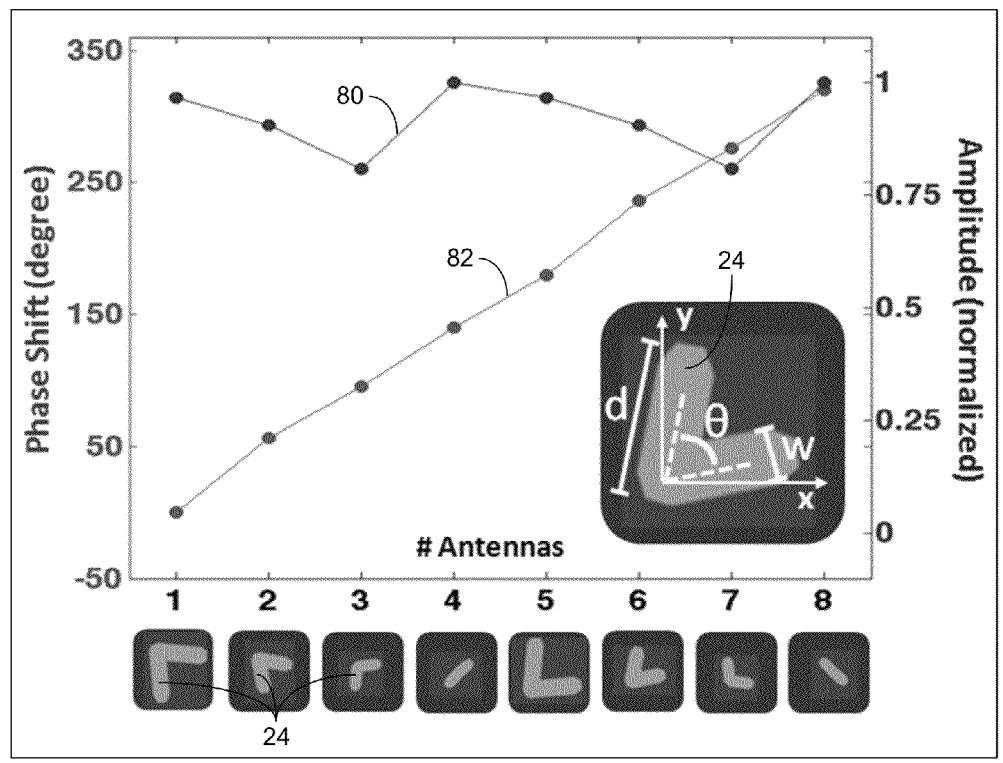
FIG. 36 plots the phase shifts and scattering amplitudes obtained via FDTD simulations in cross-polarization for the eight antennas used in a metasurface.

FIG. 36 shows the cross-polarized scattering amplitudes 80 and the corresponding phase shifts 82 for the eight antennas obtained with full wave simulations using the Finite Difference Time Domain (FDTD) technique. Using Eqs. (7) and (8), two lenses were designed with radius, r=0.45 mm, and focal lengths, f=3 cm (NA=0.015) and f=6 cm (NA=0.075), respectively, and an axicon with the same radius and an angle β=0.5°. The devices are fabricated by patterning a double-side-polished un-doped silicon wafer with gold nano-antennas using electron beam lithography (EBL). The antenna arrays were surrounded by an opaque mask (15-nm-thick titanium and 200-nm-thick silver) that completely reflects the fraction of the incident beam that is not impinging on the arrays. To avoid multi-reflections in the silicon wafer, a λ/4 anti-reflective coating film of SiO was evaporated on the backside of the wafer that is not decorated with antennas. The incident beam has a radius, $w_o$=~0.6 mm ($w_o$ is the radius at which the field amplitude drops to 1/e of the peak value) to ensure that the entire array is illuminated by a plane-wave-like wavefront. The measurement setup is shown in FIG. 37.

In FIG. 36, the parameters characterizing the antennas 24 from 1 to 4, respectively are as follows: d=180 nm, 140 nm, 130 nm, 85 nm and θ=79°, 68°, 104°, 175°. Antennas 24 from 5 to 8 are obtained by rotating the first set of antennas by an angle of 90° counter-clockwise. The width of each antenna 24 is fixed at w=50 nm.

Figure 37:
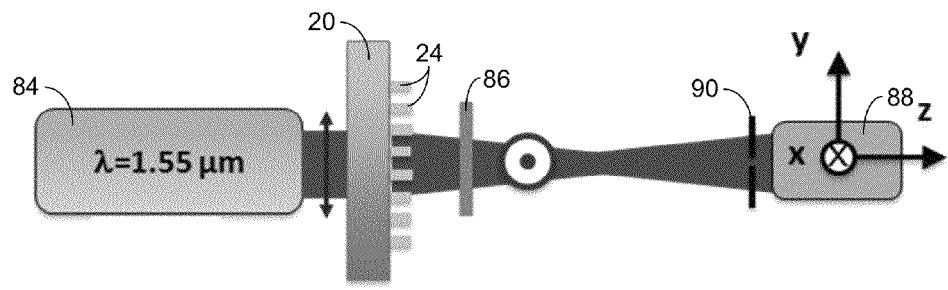
FIG. 37 is a schematic illustration of an experimental apparatus including a diode laser, optical plate with antennas, polarizer, pinhole aperture and detector.

In the experimental setup of FIG. 37, a diode laser beam 84 at λ=1.55 μm is incident onto the sample 20 with y-polarization. The light scattered by the metasurface in x-polarization is isolated with a polarizer 86. A detector 88 mounted on a 3-axis motorized translational stage collects the light passing through a pinhole in a mask 90 attached to the detector 88, wherein the pinhole is an aperture of 50-μm diameter. Note that the lenses (and the axicons discussed later) work also for x-polarized illumination because of symmetry in the design—the antennas have their symmetry axis along the 45-degree direction. X-polarized illumination will lead to y-polarized focused light.

Figure 38:
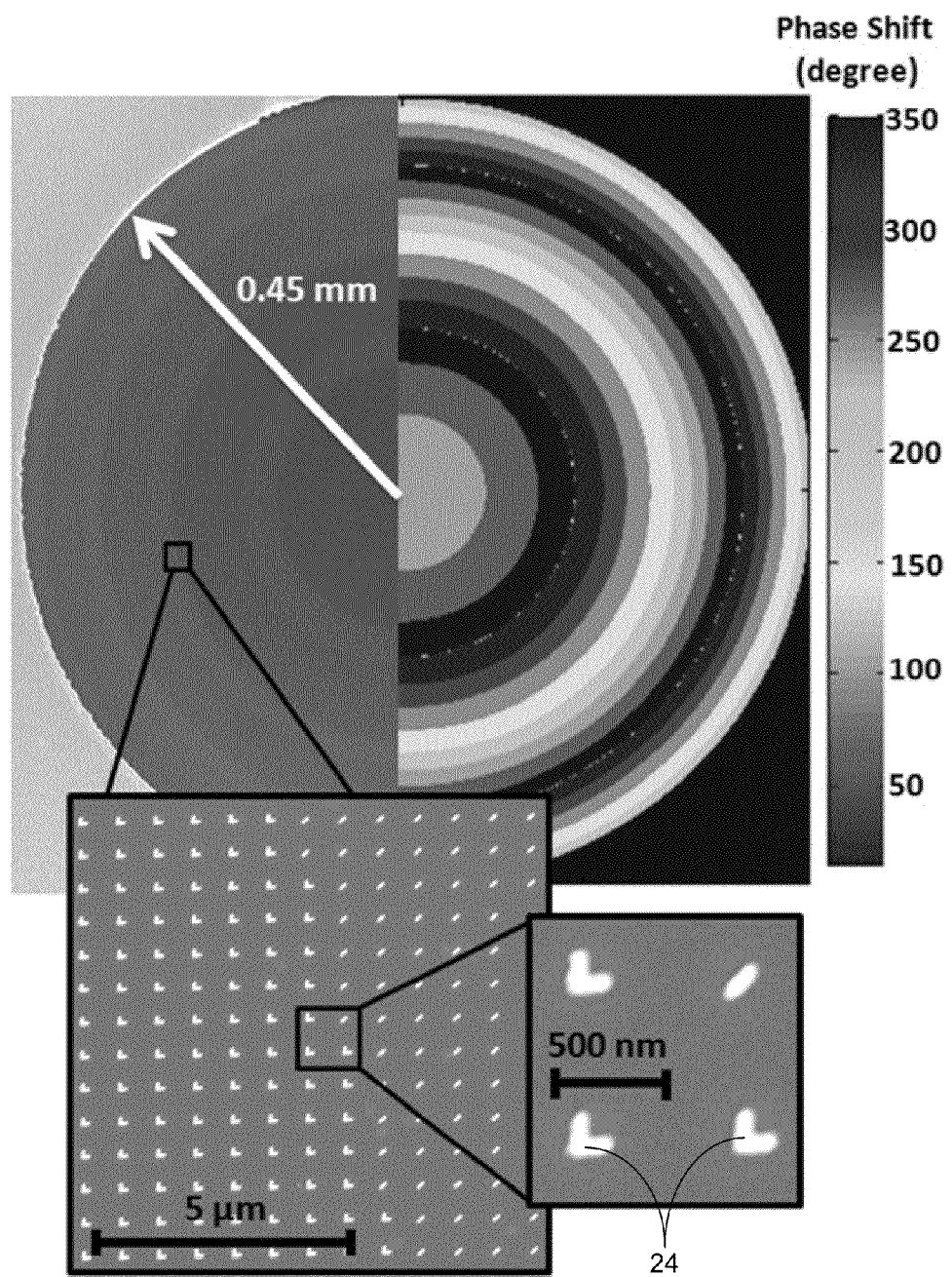
FIG. 38 includes an SEM image of a fabricated lens (at left) with magnified insets, below, and a representation of the phase shift profile (at right).

An SEM image of the fabricated lens with 3 cm focal distance is provided on the left side of FIG. 38. The corresponding phase shift profile calculated from Eq. (7) and discretized according to the phase shifts of the eight antennas 24 is displayed on the right side of FIG. 38. The inset in FIG. 38 provides a magnified view of patterned antennas 24. The distance between two neighboring antennas 24 is fixed at Δ=750 nm in both directions for all the devices.

To facilitate the design of the metasurfaces, we used a simple analytical model based on dipolar emitters. The emission of these antennas can be well approximately by that of electric dipoles, and the intensity of the field ($|E|^2$) scattered from a metasurface for a particular distribution of amplitudes and phases of the antennas can be calculated by superposing the contributions from many dipolar emitters. This approach offers a convenient alternative to time-consuming FDTD simulations. The metasurface is modeled as a continuum of dipoles with identical scattering amplitude and a phase distribution given by Eqs. (7) and (8). By comparing calculations based on this model and the experimental data, we can determine whether the phase discretization and the slight variations in the scattering amplitudes of the eight antennas create substantial deviations from the operation of ideal devices.

Figure 39:
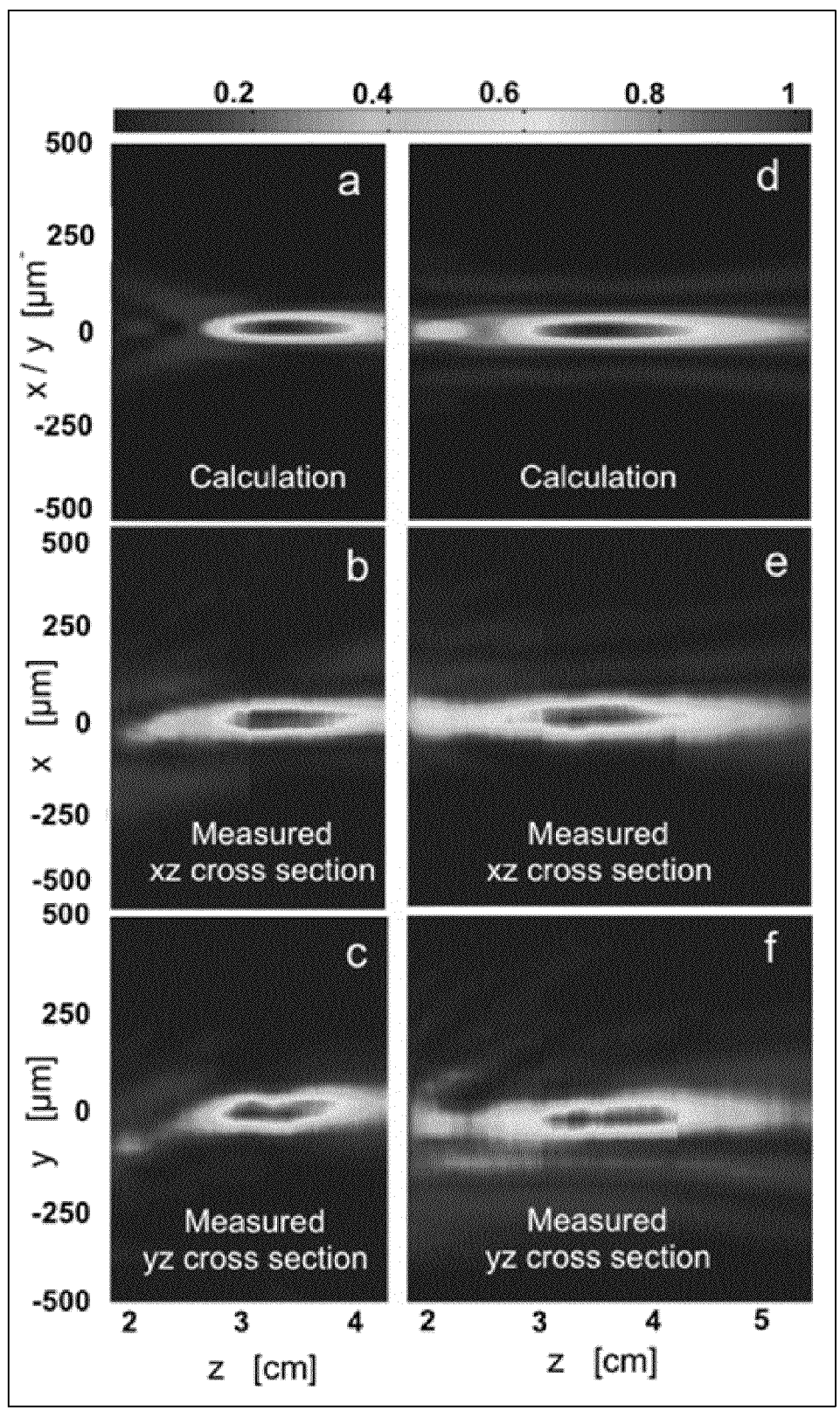
FIG. 39 shows the intensity distributions for a flat lens obtained both via theoretical calculations and via experimental results.

The measured far-field for the lens with 3-cm focal distance and the corresponding analytical calculations are presented in frames (a)-(c) of FIG. 39. The field-distribution image presented in frame (a) is calculated using the dipolar model, while the field-distribution images in frames (b) and (c) are the experimental results showing the x-z and y-z longitudinal cross section of the 3-dimensional far-field distributions.

The results for an ideal axicon and for the axicon metasurface are presented in frames (d)-(f) of FIG. 39, where theoretical calculations [frame (d)] and experimental results [frames (e) and (f)] of the intensity distribution for the planar axicon with $\beta=0.5°$. Note that the actual non-diffracting distance of the axicon metasurface is shorter than the ideal depth of focus (DOF) because the device is illuminated with a collimated Gaussian beam instead of a plane wave.

Figure 40:
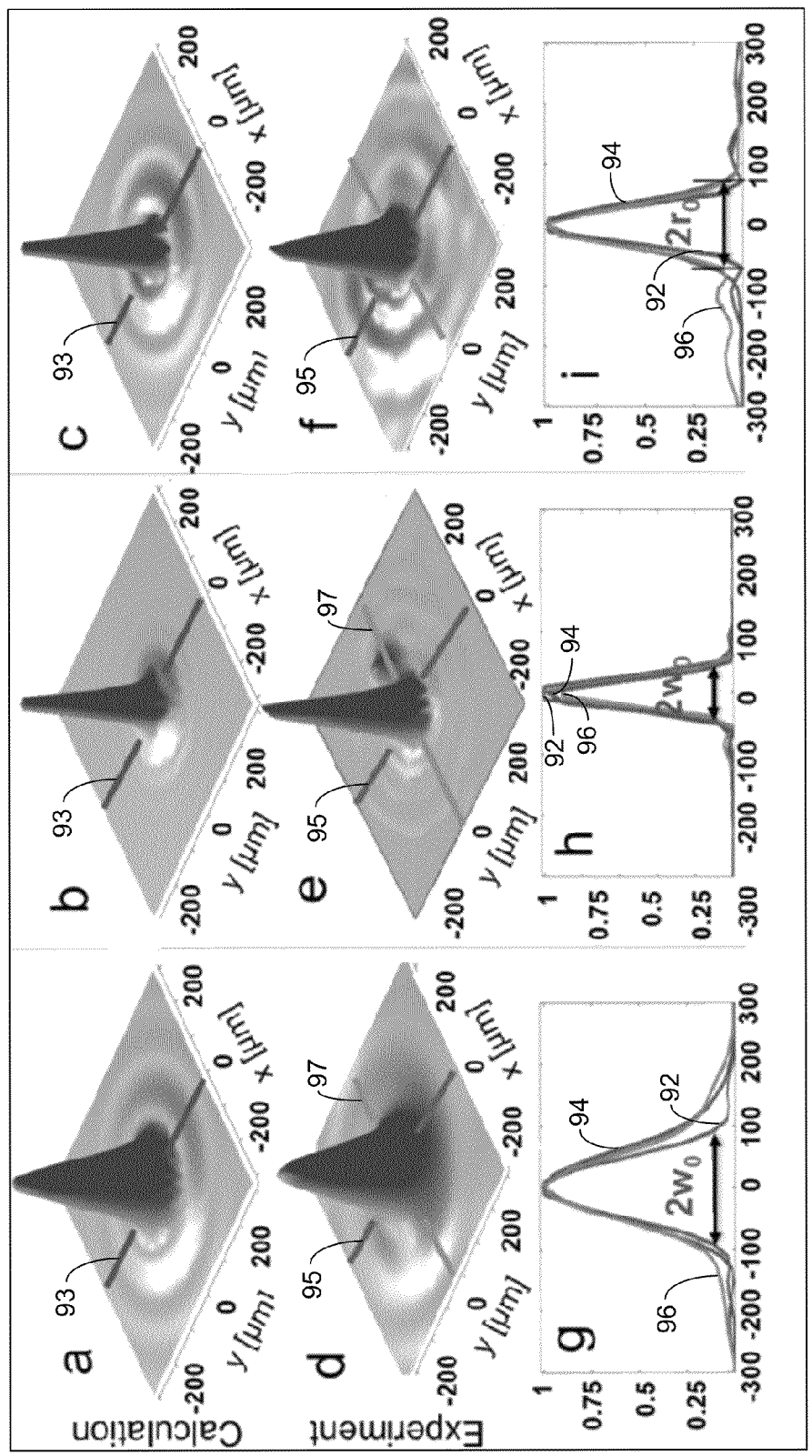
FIG. 40 includes plots (both calculated and experimental) of the intensity profiles obtained with flat lenses and with an axicon in the transverse direction.

In FIG. 40, the calculated and measured intensity profiles in the transverse direction for the three devices are presented. For the lenses, we choose the focal planes to be at z=6 cm [frames (a), (d) and (g) in FIG. 40] and z=3 cm [frames (b), (e), (h) in FIG. 40]. For the axicon, the transverse cross section was taken at a distance of 3.5 cm from the interface, which is within the DOF [frames (c), (f), (i) in FIG. 40].

Frames (a)-(c) of FIG. 40 present the transverse cross-section of the intensity profiles calculated using the analytical model for the 6-cm focal lens (a), the 3-cm focal lens (b) and the axicon (c). Frames (d)-(f) are the measured transverse cross-sections of the intensity profiles for the 6-cm focal lens (d), 3-cm focal lens (e) and axicon (f). In frames (a) and (b), the transverse sections are taken at the focal planes at z=6 cm and z=3 cm, respectively. In frame (c), it is taken at z=3.5 cm. In frames (g)-(i), curves 92 are the line scans 93 of frames (a)-(c), while curves 94 and 96 are the line scans 95 and 97, respectively, of frames (d)-(f). The beam waists ($w_o$) and the radius of the central lobe ($r_0$) are shown for the focused Gaussian beams and the Bessel beams, respectively.

The experimental setup used in these measurements is the same as that shown in FIG. 37. For the measurements in frames (e)-(h) of FIG. 40, we used a 15-µm-aperture pinhole. Note the good agreement between calculations and experiments. We estimate that the width of the central lobes for the measured transverse sections differ from the expected values by 5-10%, which is attributed to the finite size of the pinhole in front of the detector. The measured profiles display the difference between the Airy patterns generated by the lenses and the Bessel beam created by the axicon.

Figure 41:
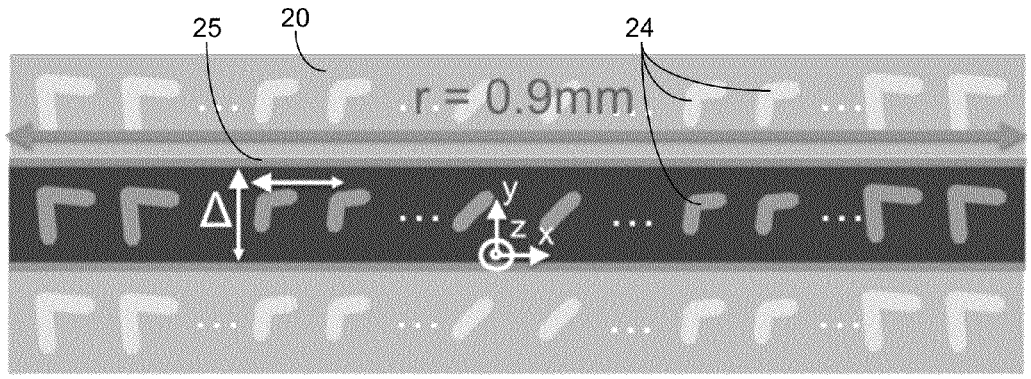
FIG. 41 is a schematic illustration of a simulate unit cell of antennas.

To prove the possibility of creating lenses with high NA, we performed FDTD simulations of the metasurfaces. Instead of the whole lens comprising a 2D array of antennas, we simulated only the unit cell (FIG. 41). The simulated area is 0.9 mm long, and the antennas are separated by a distance $\Delta=300$ nm. We used Eq. (7) to create a distribution of phase shifts for focusing light at the distance, f. In the y-direction we use periodic boundary conditions as indicated by the orange lines. In this way the phase modulation is present only in the x-direction and the effect will be the same as that of a cylindrical lens. This simplified design is equivalent to a cylindrical lens; it is useful for understanding the focusing proprieties of a high numerical aperture objective.

Figure 42:
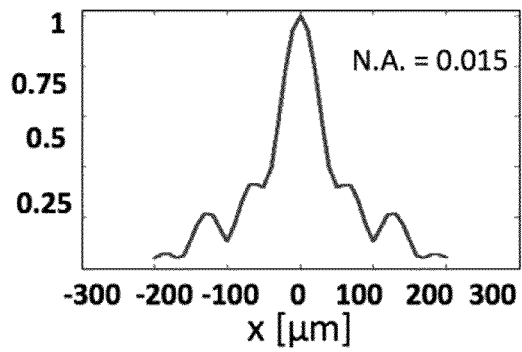
FIGS. 42 and 43 are plots of the cross-sections at the focal planes for f=3-cm (NA=0.015) and f=371-µm (NA=0.77) lenses, respectively.
Figure 43:
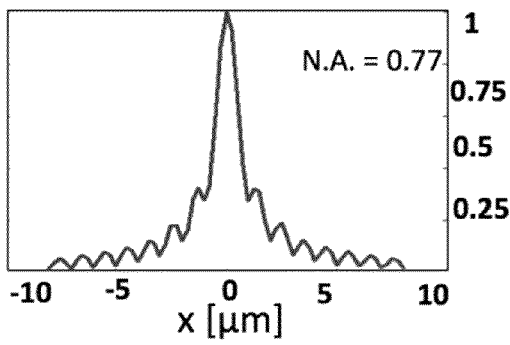

FIG. 42 shows the cross-sections of the intensity at the focal plane of the lenses with NA=0.015 and f=3 cm (as in the fabricated device), while FIG. 43 shows the cross-sections of the intensity at the focal plane of the lenses with f=371 µm and NA=0.77. The beam waists are $w_o$=50 µm and $w_o$=1 µm, respectively.

The design of this new class of focusing devices can be free from monochromatic-aberrations, which are typically present in conventional refractive optics. The phase distribution created from a spherical lens can focus the light to a single point only in the limit of paraxial approximation; a deviation from this condition introduces monochromatic aberrations, such as spherical aberrations, coma and astigmatism. To circumvent these problems, complex optimization techniques, such as aspheric shapes or multi-lens designs, are implemented. In this case, the hyperboloidal phase distribution imposed at the interface produces a wavefront that remains spherical even for non-paraxial conditions, leading to high NA focusing without aberrations.

In this design, the focusing efficiency is approximately 1%. Increasing the antenna spacing from the current value of 750 nm to 220 nm will lead to ~10% efficiency, based on our simulations. Additional efficiency increases are achievable by reducing optical losses using low-loss metals or other plasmonic materials. Finally, by exploiting antenna designs with higher scattering amplitude (e.g., antennas with a metallic back plane operating in reflection mode), focusing efficiencies up to 80% may be achieved.

Ultra-thin and high-NA lenses may be used in applications in microscopy or in other imaging tools. These planar lenses and axicons can be designed for other spectral regions and may become particularly interesting in the mid-infrared, the terahertz and those ranges of frequencies where transparent refractive materials are harder to find compared to the near-infrared and the visible.

Although the present design is diffraction-limited, focusing and imaging below the diffraction limit in the far field can be achieved using plates patterned with structures that provide subwavelength spatial resolution of the phase and amplitude of light. Optical phase discontinuities may find applications in such microscopy techniques with super resolution.

Broadband, Background-Free Quarter-Wave Plate Based on Plasmonic Metasurfacs

The following is a demonstration of optically thin quarter-wave plates built with metasurfaces that generate high-quality circularly-polarized light over a broad wavelength range for arbitrary orientation of the incident linear polarization. The metasurface includes an array of plasmonic antennas with spatially varying phase and polarization response. Experimentally demonstrated quarter-wave plates generate light with a high degree of circular polarization (i.e., >0.97) from $\lambda$=5 to 12 µm, representing a major advance in performance compared to previously reported plasmonics-based wave plates.

Considerable attention has been drawn to the properties of anisotropic metallic and dielectric structures, which can mimic the polarization-altering characteristics of naturally-occurring birefringent and chiral media. Sub-wavelength gratings introduce form birefringence and have been used to make quarter-wave plates for infrared and sub-millimeter waves. Planar chiral metasurfaces change the polarization state of transmitted light. Circular polarizers based on three-dimensional chiral metamaterials primarily pass light of circular polarization of one handedness while the transmission of light of the other handedness is suppressed (circular dichroism). Because of the difficulty of fabricating thick chiral metamaterials, the demonstrated suppression ratio between circular polarizations of different handedness is quite small (i.e., <10). One way to overcome this difficulty is to use planar structures comprising strongly scattering anisotropic particles that are able to abruptly change the polarization of light. Light scattered from such particles changes polarization because the particles have different spectral responses along the two principle axes. For example, planar plasmonic wave plates have been created using arrays of identical rod or aperture metallic antennas or meander-line structures. These types of quarter-wave plates are designed by controlling the spectral responses of the plasmonic eigenmodes so their scattered waves have equal amplitude and a $\pi/2$ phase difference at the excitation wavelength. This is achieved, for example, by tuning the length of orthogonally oriented dipolar antennas or by adjusting the inductive and capacitive impedance along the two axes of the meander-line structures.

Figure 44:
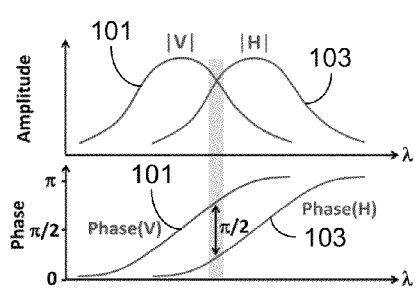
FIG. 44 plots the phase and amplitude of two orthogonal plasmonic eigenmodes of a conventional quarter-wave plate.

These planar wave plates have a number of shortcomings. For example, their bandwidth is limited because of the relatively narrow resonance of the plasmonic eigenmodes. Once the structures operate away from the optimal wavelength (gray area), the amplitude ratio, R, between the two eigenmodes, V 101 and H 103, deviates from unity and their differential phase, $\Psi$, is no longer $\pi/2$ (as shown in FIG. 44). Another limitation is that the performance of plasmonic wave plates is usually degraded by the optical background that originates from direct transmission through the empty space around the metallic structures (e.g., cross antennas or meander-lines).

The following description is directed to metasurfaces based on phased antenna arrays that generate scattered light waves with arbitrary polarization states. In particular, we demonstrated a quarter-wave plate that features ultra-broadband and background free performance and that works for any orientation of the incident linear polarization.

Figure 45:
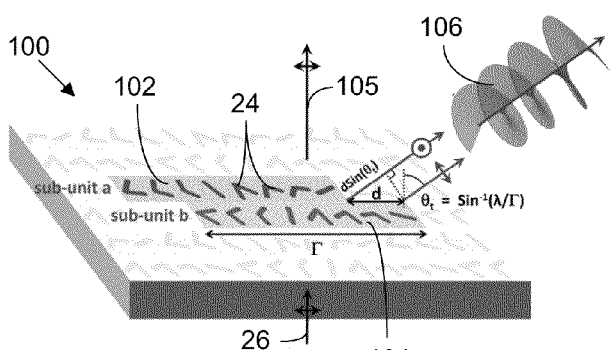
FIG. 45 shows an antenna array with offset sub-units for generating two co-propagating waves with equal amplitudes, orthogonal linear polarizations, and a $\pi/2$ phase difference (when offset d=Γ/4), which produce a circularly polarized extraordinary beam that bends away from the surface normal.

A schematic illustration of a metasurface quarter-wave plate 100 is shown in FIG. 45. The unit cell, which repeats across the plate 100, includes two sub-units 102 and 104, each including a series of eight gold V-shaped (or linear) antennas. The two sub-units 102 and 104 generate two co-propagating waves with equal amplitudes, orthogonal polarizations, and a $\pi/2$ phase difference (when offset, $d=\Gamma/4$). The waves coherently interfere, producing a circularly polarized extraordinary beam 106 that bends away from the propagation direction of the ordinary beam 26 (as shown in FIG. 45). Due to the spatial separation of the two beams, the extraordinary beam 106 is background-free. Additionally, the amplitudes of the waves scattered from the two sub-units are equal because corresponding antenna 24 in the sub-units 102 and 104 have the same geometries (i.e., arm length and opening angle); the orthogonal polarizations are ensured by the different antenna orientations in the sub-units 102 and 104. This metasurface also generates an ordinary beam 105 propagating normal to the surface and polarized in the same way as the incident light 26.

Figure 46:
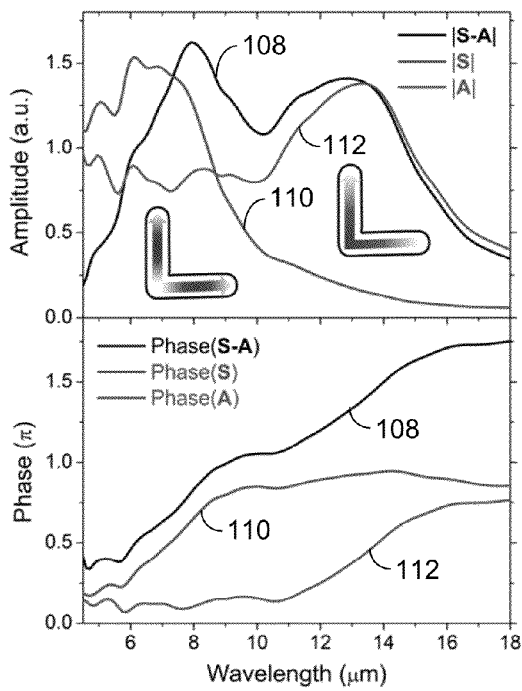
FIG. 46 plots the phase and amplitude responses of S, A, and S−A for a representative V-antenna obtained by full-wave simulations; here, S and A represent the complex scattering amplitudes of the symmetric and antisymmetric eigenmodes, respectively.
Figure 47:
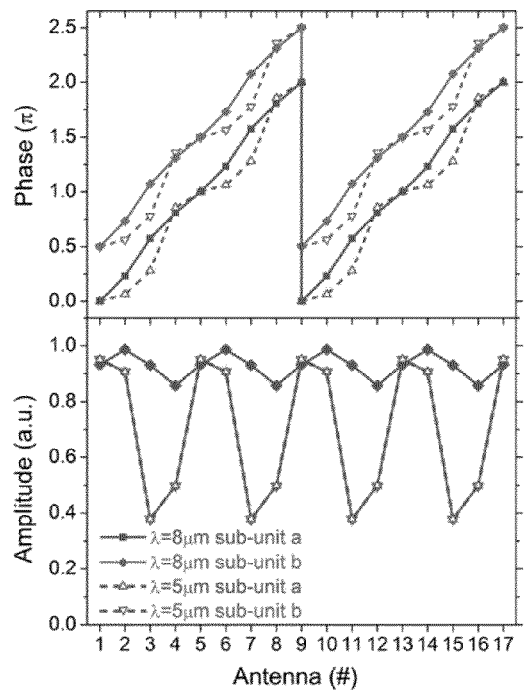
FIG. 47 plots the calculated phase and amplitude responses along the antenna array.

This quarter-wave plate 100 performs well over a much larger wavelength range compared to existing designs for two reasons. First, the V-antennas 24 have a much broader effective resonance over which the antenna scattering efficiency is significant and the phase response is approximately linear, as shown in FIG. 46, where the amplitude and phase responses of S−A 108, S 110, and A 112 for a representative V-antenna obtained by full-wave simulations are plotted; here, S and A represent the complex scattering amplitudes of the symmetric and antisymmetric eigenmodes, respectively. The broadened resonance is a result of the combined responses of the two eigenmodes of the V-antennas. Second, the metasurfaces are robust against wavelength change because we use a "balanced" design featuring two sub-units 102 and 104 in one unit cell. Away from the optimal operating wavelength, the phase and amplitude responses of the array antennas will deviate from their designed values (as shown in FIG. 47); nevertheless, the two waves scattered from the two sub-units 102 and 104 have the same wavefronts so they always contribute equally to the extraordinary beam, resulting in a pure circular polarization state.

The basic elements in this metasurface design are gold V-shaped antennas. Each antenna supports symmetric and antisymmetric eigenmodes, which are excited by the components of the incident electric field polarized parallel and perpendicular to the symmetry axis of the V-structure, respectively. The arm (rod) length of the V-antenna was 1.2 µm, and the angle between the two arms was 90° C., as shown by the insets of FIG. 46. The two current eigenmodes of the antenna are shown in the insets. The arrows refer to the direction of current flow and the colors represent current density, with darker shading representing larger currents. The scattered light from the antenna can be decomposed into two components, (S+A) and (S−A). Via the design of the phase and amplitude responses of these components in the antenna arrays, we can spatially separate them so that (S+A) and (S−A) lead to, respectively, the ordinary and extraordinary beams propagating in different directions. Because of the much broader effective plasmonic resonance as a result of the combined responses (i.e., S−A as compared to S or A), these metasurface quarter-wave plates can provide significant scattering efficiency over a broader wavelength range, as is shown in the upper panel of FIG. 46. The combined plasmonic resonances can also provide a larger coverage in the phase response (i.e., ~1.5$\pi$ for S−A as compared to ~0.75$\pi$ for S or A), as is shown in the lower panel of FIG. 46.

For arbitrary incident polarization, both symmetric and antisymmetric eigenmodes are excited and contribute to the antenna scattering response. The scattered waves from the eight antennas in a sub-unit 102/104 can be written as follows:

$$\begin{pmatrix} \vec{E}_1 \\ \vec{E}_2 \\ \vec{E}_3 \\ \vec{E}_4 \\ \vec{E}_5 \\ \vec{E}_6 \\ \vec{E}_7 \\ \vec{E}_8 \end{pmatrix} = \frac{1}{2} \begin{bmatrix} S_1 - A_1 \\ S_2 - A_2 \\ S_3 - A_3 \\ S_4 - A_4 \\ -(S_1 - A_1) \\ -(S_2 - A_2) \\ -(S_3 - A_3) \\ -(S_4 - A_4) \end{bmatrix} [\cos(2\beta - \alpha)\hat{y} + \sin(2\beta - \alpha)\hat{x}] + \quad (9)$$

$$\frac{1}{2}\begin{pmatrix} S_1+A_1 \\ S_2+A_2 \\ S_3+A_3 \\ S_4+A_4 \\ S_1+A_1 \\ S_2+A_2 \\ S_3+A_3 \\ S_4+A_4 \end{pmatrix}(\cos\alpha\hat{y}+\sin\alpha\hat{x})$$

Figure 48:
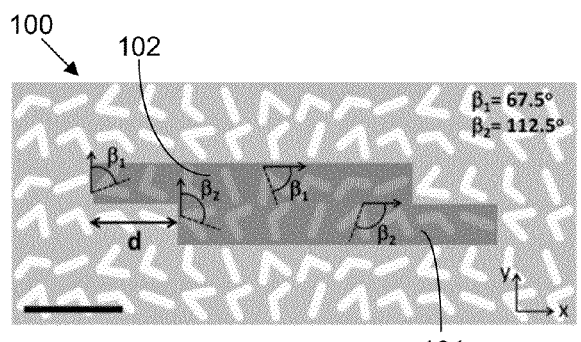
FIG. 48 is a scanning electron microscope (SEM) image of a metasurface quarter-wave plate.
Figure 49:
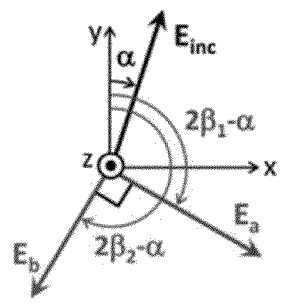
FIG. 49 is a schematic illustration showing the polarization of the two waves, $E_a$ and $E_b$, scattered from the two sub-units, as well as that of the incident light.

Here, $\alpha$ and $\beta$ are the orientation angles of the incident field and the antenna symmetry axis, respectively; $\hat{x}$ and $\hat{y}$ are the unit vectors along the x and y axes, respectively (FIGS. 48 and 49); $S_i$ and $A_i$ are the complex scattering amplitudes of the symmetric and antisymmetric mode of the ith antenna in the sub-unit, respectively (FIG. 46). Equation (9) shows that the scattered light from the antennas ($\vec{E}_i$, with i=1-8) contains two terms, which are polarized along the (2β-α)-direction and the α-direction from the y-axis, respectively. The antenna array is designed so that at λ=8 μm, the (2β-α)-polarized components of all the antennas have the same amplitude and an incremental phase of ΔΦ=π/4. That is, $|S_i-A_i|$ is constant, with i=1-4, and Phase($S_{i+1}-A_{i+1}$)−Phase($S_i-A_i$)=π/4, with i=1-3 (see FIG. 47, where calculated phase amplitude responses for two consecutive sub-units, a and b, are shown). Therefore, the (2β-α)-polarized partial waves scattered from the antenna array produce a wave propagating along the $\theta_t$=arc Sin(λ/Γ) direction from the surface normal; here, λ is the free-space wavelength, and Γ is the length of the sub-unit. On the other hand, the α-polarized components, which have the same polarization as the incident light, have unequal amplitudes but similar phase responses. Therefore, the α-polarized partial waves combine to form a wave that propagates in a direction normal to the metasurface for normally incident light and contributes to the ordinary beam.

In FIG. 47, the square plot is for excitation of sub-unit a with an excitation wavelength of 8 μm; the diamond plot is for excitation of sub-unit b with an excitation wavelength of 8 μm; the upward-pointing triangle plot is for excitation of sub-unit a with an excitation wavelength of 5 μm; and the downward-pointing triangle plot is for excitation of sub-unit b with an excitation wavelength of 5 μm. As designed, the phase response at λ=8 μm exhibits an almost constant gradient (i.e., 2π over eight antennas in the sub-unit); the amplitude response at this wavelength is quite uniform. These properties correspond to an extraordinary beam with a flat wavefront and high intensity. However, at λ=5 μm the phase response does not follow a perfect linear profile and the amplitude response shows large variations. Even in this non-ideal situation, however, one still obtains an extraordinary beam with close-to-unity degree of circular polarization (but with reduced intensity) because the waves scattered from the two sub-units always give equal contributions to the beam since they have exactly the same wavefronts (compare the dashed curves in the upper and lower panel of FIG. 47).

The metasurface quarter-wave plate 100 has a unit cell consisting of two sub-units 102 and 104 that each include eight V-antennas and are offset from each other in the horizontal direction by d (as shown in FIG. 48). The last four antennas in each sub-unit are obtained by rotating the first four clock-wise by 90°. Antenna orientation angles are indicated by β1 and β2, and dashed lines represent the antenna symmetry axes. The scale bar represents 4 μm. The surface shown in FIG. 48 is a small portion of the wave plate 100. The entire antenna array has a footprint of 230×230 μm² to accommodate the plane-wave like incident wave. A schematic illustration showing the polarization of the two waves, $E_a$ and $E_b$, scattered from the two sub-units, as well as that of the incident light, is provided in FIG. 49.

The sub-units 102 and 104 create two coherent waves that propagate along the $\theta_t$=arc Sin(λ/Γ) direction (as shown in FIG. 45). The waves spatially overlap since the spacing between the two sub-units 102 and 104 in the y-direction is much smaller than the free-space wavelength (see FIG. 48). The waves have equal amplitudes because the corresponding antennas in the two sub-units 102 and 104 have the same geometries (i.e., arm length and opening angle of the V-structures). Cross polarization between the waves is achieved by choosing antenna orientations, $\beta_1$=67.5° and $\beta_2$=112.5°, so that (2$\beta_2$-α)-(2$\beta_1$-α)=90° (as shown in FIGS. 48 and 49). The 90° phase difference between the waves as well as the handedness of the circular polarization is controlled by choosing the offset d=±Γ/4, so that Ψ=$k_o$d Sin($\theta_t$)=2πd/Γ=±90°; as a result of these properties, the waves scattered from the two sub-units 102 and 104 coherently interfere, producing a circularly polarized extraordinary beam 106 (see FIG. 45). Note that once $\beta_2-\beta_1$=45°, the two waves will always be cross polarized, which is independent of the orientation angle α of the linearly polarized incident light 26.

Figure 50:
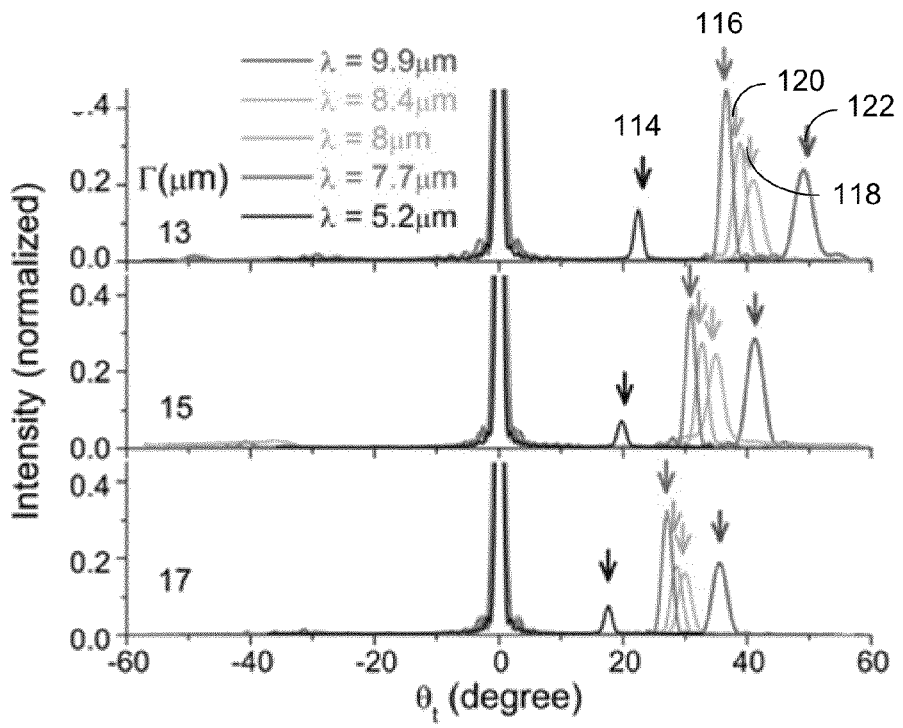
FIG. 50 provides experimental far-field scans showing extraordinary beams at $\theta_t>0$ generated by metasurfaces with different interfacial phase gradients at different wavelengths, as well as the ordinary beams located at $\theta_t=0$, given normally incident excitation.

These optical antenna arrays can provide phase coverage from 0° to 360° with an increment of ~45° over a wide range of wavelengths. Therefore, the metasurface quarter-wave plates 100 can generate well-defined extraordinary beams 106 over a broad spectral range. FIG. 50 shows experimental far-field scans showing extraordinary beams at $\theta_t$=0 generated by metasurfaces with different interfacial phase gradients (from 2π/13 μm to 2π/17 μm at excitation wavelengths of 5.2 μm (114), 7.7 μm (116), 8 μm (118), 8.4 μm (120), and 9.9 μm (122), as well as the ordinary beams located at $\theta_t$=0, given normally incident radiation. Three samples with Γ=13, 15, and 17 μm were tested; and the incident polarization was along the y-axis (α=0°). The scans were normalized with respect to the intensity of the ordinary beams. At a wavelength of 7.7 μm, the intensity of the extraordinary beams is 30-40% of that of the ordinary beams, corresponding to ~10% of the total incident power. The arrows indicate the calculated angular positions of the extraordinary beams according to $\theta_t$=arc Sin(λ/Γ). For all samples and excitation wavelengths, we observed the ordinary and extraordinary beams and negligible optical background. The observed angular positions of the extraordinary beams agree very well with the generalized law of refraction in the presence of the interfacial phase gradient. At 8 μm, close to the optimal operation wavelength, these metasurfaces scatter approximately 10% of the incident light into the extraordinary beam. The power dissipated in the antenna structures due to absorption is about 10% of the incident power.

Figure 51:
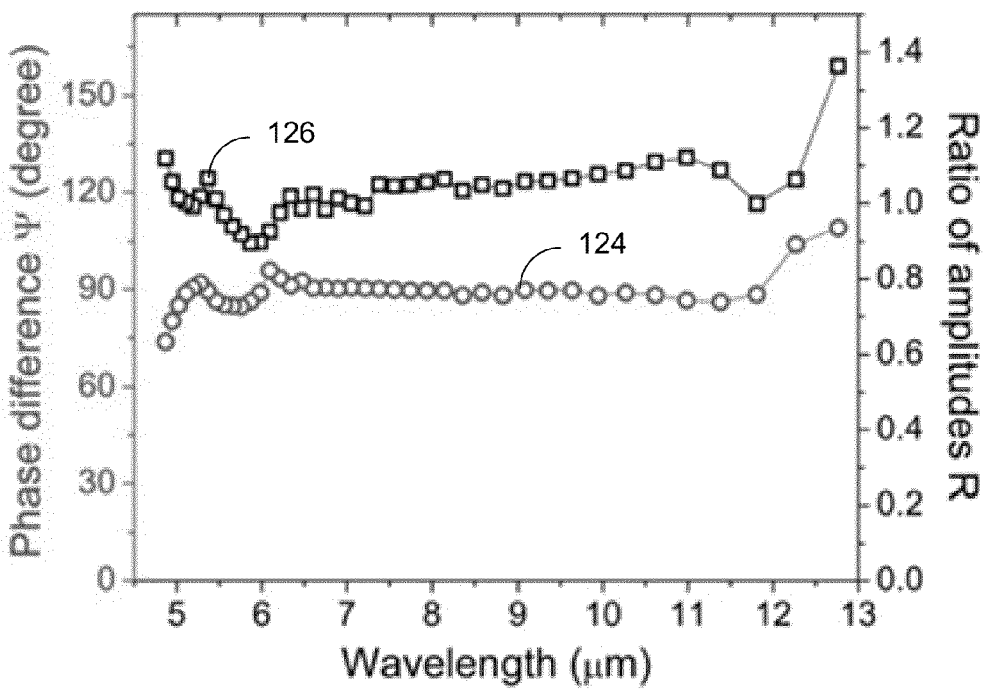
FIG. 51 plots the calculated phase difference, $\Psi$, and ratio of amplitudes, R, between the two waves, $E_a$ and $E_b$, as a function of wavelength.

FIG. 51 shows the phase difference (Ψ) 124 and amplitude ratio (R) 126 between the two waves, $E_a$ and $E_b$, as a function of wavelength, scattered from the sub-units, as calculated via full-wave numerical simulations using the finite difference time domain (FDTD) method. It is observed that Ψ 124 and R 126 are in the close vicinity of 90° and 1, respectively, over a wide wavelength range from λ=5 to 12 μm; correspondingly, a high degree of circular polarization (DOCP) 128 close to unity can be maintained over the wavelength range (see FIG. 52, which also plots the intensity of the extraordinary beam 130 as a function of wavelength). Here, DOCP 128 is defined as $|I_{RCP}-I_{LCP}|/|I_{RCP}+I_{LCP}|$, where $I_{RCP}$ and $I_{RCP}$ stand for the intensities of the right and left circularly polarized components in the extraordinary beam, respectively. We observed in experiments that the extraordinary beam is circularly polarized with high purity between $\lambda=5$ μm and 10 μm (as shown in FIG. 53, which provides a state-of-polarization analyses for the extraordinary beam at $\lambda=5.2$, 8, and 9.9 μm). The experimentally demonstrated suppression ratio between $I_{RCP}$ and $I_{RCP}$ is ~500, 700, and 400 at $\lambda=9.9$, 8, and 5.2 μm, respectively. The extraordinary beam reaches its peak intensity 130 at $\lambda\approx7$ μm (as shown in FIG. 52). The intensity 130 decreases towards longer and shorter wavelengths because the S–A components of the scattered light from the antenna arrays start to have mismatched amplitudes and a nonlinear phase distribution. We define the bandwidth of a quarter-wave plate, $\Delta\lambda_{qw}$, as the wavelength range over which the DOCP 128 is sufficiently close to 1 (e.g., >0.95) and over which an output with high intensity 130 can be maintained (e.g., intensity larger than half of the peak value). According to this definition, the bandwidth of these metasurface quarter-wave plates 100 is about 4 μm (i.e., from $\lambda\approx6$ to 10 μm; see FIG. 52), which is about 50% of the central operating wavelength, $\lambda_{central}$.

Figure 56:
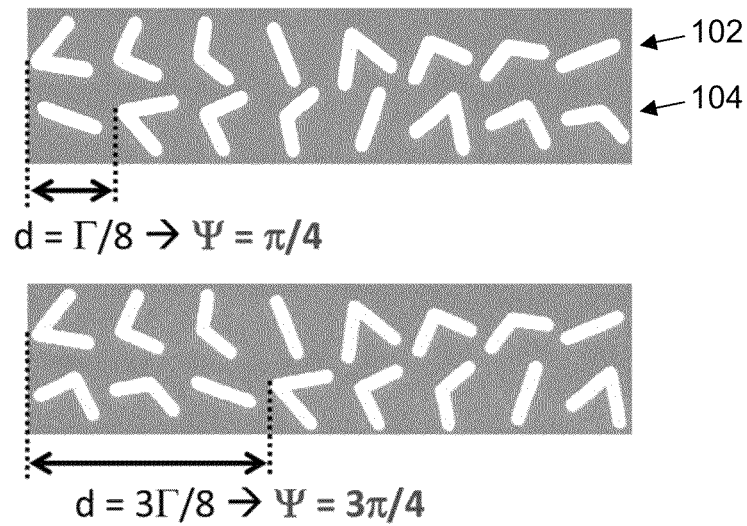
FIG. 56 provides SEM images of offset unit cells of antenna arrays for elliptical polarization.
Figure 57:
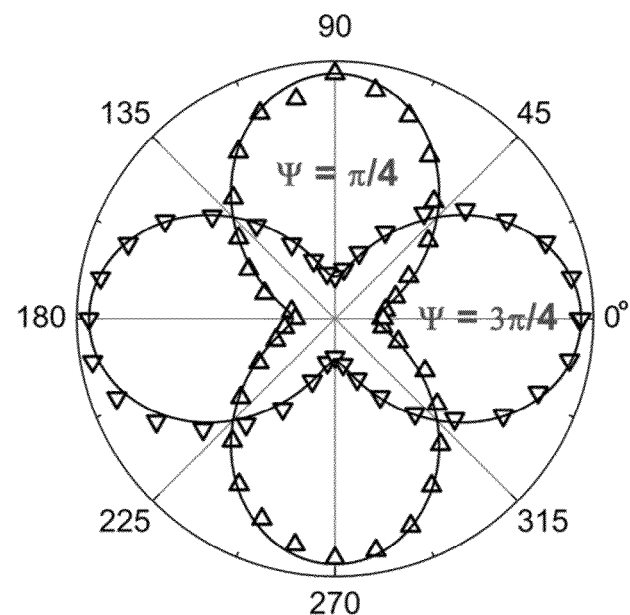
FIG. 57 provides a state-of-polarization analyses for the array of FIG. 56.

We have verified that the intensity and propagation direction of the extraordinary beam is independent of the orientation of the incident linear polarization (as shown in FIG. 54, which plots the normalized intensity of ordinary and extraordinary beams generated by a metasurface quarter-wave plate at different incident polarizations in experimental far-field scans). The extraordinary beam maintains a high DOCP when the incident polarization changes (as shown in FIG. 55, which provides a state-of-polarization analyses for the extraordinary beam at three different incident polarizations). The polarizations of the waves scattered from the two sub-units 102 and 104 are controlled by angles, $\alpha$, $\beta_1$, and $\beta_2$, and their amplitudes are controlled by the scattering amplitudes, S and A, of the antenna eigenmodes (Eq. (9)). This decoupling between polarization and amplitude allows us to synthesize beams with arbitrary polarization states. In addition to circularly polarized beams (FIGS. 48-53), we were also able to generate elliptically-polarized extraordinary beams by simply changing the sub-unit offset d (see FIGS. 56 and 57). The offset between the sub-units, d, controls the phase difference between the waves scattered from the two sub-units and therefore the polarization of the extraordinary beam. The phase difference is $\Psi=k_o d \sin(\theta_t)=2\pi d/\Gamma$. Therefore, while $d=\Gamma/4$ will lead to circular polarization, elliptical polarization states corresponding to $\Psi=\pi/4$ and $3\pi/4$ are shown in FIG. 57, as a result of the offset configuration in FIG. 56. For example, when $d=\Gamma/8$ (or $3\Gamma/8$), the two waves scattered from the sub-units 102 and 104 have perpendicular polarization, equal amplitude, and a phase difference of $\Psi=\pi/4$ (or $3\pi/4$), forming an elliptically-polarized beam. The state-of-polarization analyses of the beam shown in FIG. 57 are in close agreement with analytical calculations. The incident polarization is $\alpha=0°$. The symbols are measurements, and the curves are analytical calculations assuming that the two scattered waves have equal amplitude and a phase difference equal to the value of indicated in the figure.

The efficiency of this metasurface design can be increased by using denser antenna arrays or by exploiting antenna designs with higher scattering amplitude. For example, reflect-array structures consisting of phased antennas separated by a dielectric spacing layer from a metallic back plane are able to shape the wavefront of reflection with high efficiency.

Wave plates are some of the most ubiquitous components in optics. Most commonly-used designs are based on bulk birefringent crystals with optical anisotropy. This conventional approach has several limitations; in particular, it is relatively narrow band, and it relies on the availability of birefringent materials in the desired frequency range. Approaches to overcome the latter limitation, which utilize form birefringence of anisotropic structures, include plasmonic antennas. These may come with their own limitations, however; in particular, they may exhibit relatively low purity of polarization and may superimpose an optical background onto the desired signal. In addition, the bandwidth of these devices may also be relatively small. The approach outlined here, which involves spatially inhomogeneous arrays of anisotropic optical antennas, may overcome many of these limitations. We experimentally demonstrated quarter-wave plates, which are broadband and feature high polarization purity (e.g., output with DOCP larger than 0.97 over $\lambda=5$ to 12 μm and with intensity larger than half-maximum over $\lambda=6$ to 10 μm). This approach can be performed with only a single step of conventional lithography and is generalizable from the visible to the radio-frequency regimes.

Mid-Infrared Reflect Array

A reflect array 131 is made of an array of optical antennas 24 separated from a metallic ground plane 132 by a dielectric spacing layer 134. The thickness of the spacing layer 134 is sub-wavelength (e.g., less than 20 μm), so the optical near-fields of antennas 24 strongly interact with the ground plane 132. In other words, there is a strong coupling between the antenna 24 and its dipolar images in the ground mirror 132. This coupling can broaden the range of phase response of the reflected waves. For example, suppose we fix the incident wavelength and change the length of a single rod antenna, the phase of scattered light from the antenna 24 can only be tuned over a range of $0$-$\pi$. However, by placing a metallic plane 132 (formed of pure or nearly pure metal) within the near-field region of the antenna 24, this phase coverage can be extended to $0$-$2\pi$, which is necessary for a complete control of optical wavefronts.

Reflect arrays 131 allow one to control the reflectivity of optical power over a wide range, from essentially zero to a large value close to unity. The metallic back plane 132 is optically thick (with a thickness larger than a few times the skin depth of light in the metal 132), so reflect arrays 131 can completely eliminate transmission. Outside the wavelength range of antenna resonance, the reflectivity of a mid-infrared reflect array 131 consisting of identical antennas 24 can be above 90% (see FIG. 60). At the resonant wavelength, $\lambda_{res}$, however, a large percentage of the incident light is trapped in the vicinity of the antennas 24 and in the dielectric spacing layer 134, and is eventually dissipated as Joule heating in the metal 132 and absorption in dielectric 134. The reflectivity of the reflect array 131 at $\lambda_{res}$ is typically not more than 50% for mid-infrared light. In the case that the effective impedance of the reflect array 131 matches with the free-space impedance, the reflectivity will drop to zero. The large modulation of reflectivity opens the possibility of designing binary reflect-array holograms that can synthesize complex 3D optical fields. To utilize reflect arrays 131 as a phase mask to mold an optical wavefront, one, however, can avoid the close vicinity of $\lambda_{res}$, where the reflectivity is too low.

Figure 58:
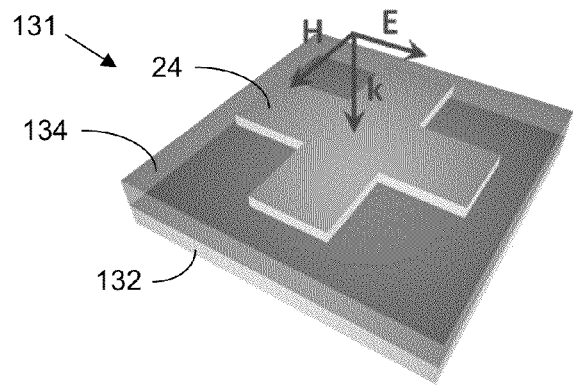
FIG. 58 is a schematic illustration of one reflect-array element based on a cross antenna.
Figure 59:
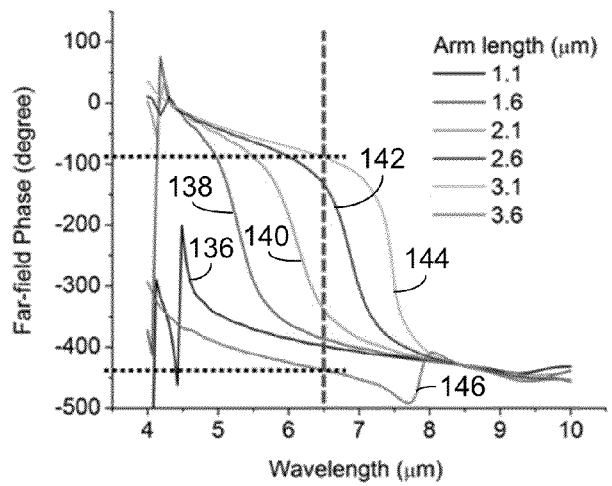
FIG. 59 plots the simulated phase of the reflected wave from an array of cross antennas, as shown in FIG. 58, as a function of wavelength and the arm length of the cross antenna.
Figure 60:
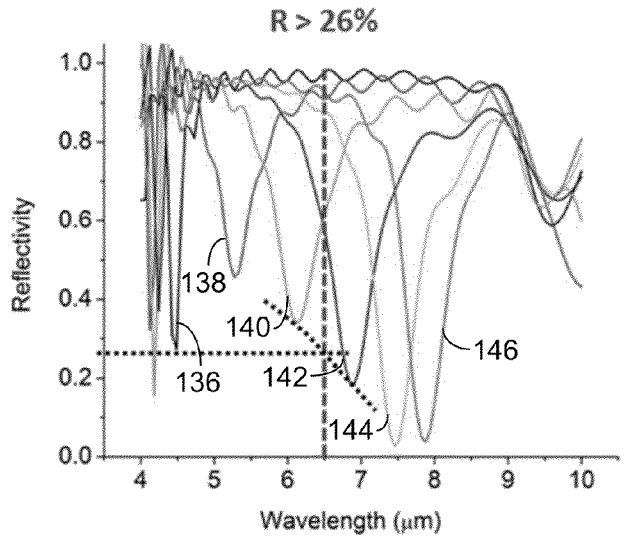
FIG. 60 plots the simulated reflection spectra from the array of cross antennas, as shown in FIG. 58, as a function of the arm length of the cross antenna.

A schematic illustration of one reflect-array element 131 for mid-infrared light (e.g., 2-20 μm) based on a gold cross-antenna is provided in FIG. 58, though arrays for generating longer and shorter wavelengths, including visible, near-infrared, and far-infrared can likewise be designed by changing the feature sizes of the antennas. The width of each arm of the cross-antenna 24 is 1 μm and the antenna thickness is 50 nm. The thickness of the SiO$_2$ dielectric spacer 134 is 400 nm. The ground plane 132 is gold. The array 131 has a square lattice, and the lattice constant is 4 μm. FIGS. 59 and 60 show, respectively, the phase of the reflect wave and the reflectivity of a periodic array 131 of the cross-antennas 24 when the length of the antenna arm changes from 1.1 to 3.6 μm in steps of 0.5 μm. Specifically, plots are provided for arm lengths of 1.1 μm 136, 1.6 μm 138, 2.1 μm 140, 2.6 μm 142, 3.1 μm 144, and 3.6 μm 146. The far-field phase plot of FIG. 59 shows that, at $\lambda=6.5$ μm, the phase of the reflected wave can be continuously tuned over 360° when the length of the antenna arm, $L_{cross}$, varies. The phase tuning is not a linear function of $L_{cross}$; most of the phase change occurs between curves 140 and 142 for $L_{cross}=2.1$ and 2.6 μm, respectively. Precise nanofabrication is therefore needed to ensure accurate phase response. The reflection spectra have a baseline of ~90% and dips corresponding to antenna resonance. The reflectivity is the smallest (minimum reflectivity ~26%) between $L_{cross}=2.1$ and 2.6 μm. The reflect array 131 can be operated as a phase mask at $\lambda=6.5$ μm using cross-antennas 24 with a variety of $L_{cross}$ values. The reflect array 131 can also be operated as a binary hologram at $\lambda=7.5$ μm. For example, one can use two types of cross antennas 24 with $L_{cross}=1.1$ and 3.1 μm to achieve reflectivity of >95% and <5%, respectively.

Figure 61:
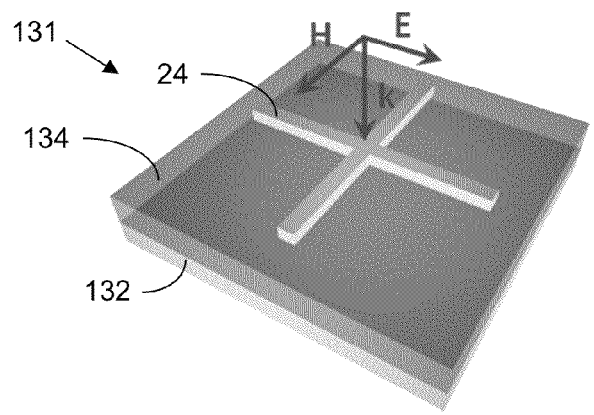
FIG. 61 is a schematic illustration of another embodiment of a reflect-array element based on a cross antenna, where the width of the cross-antenna is much thinner than that of FIG. 58.
Figure 62:
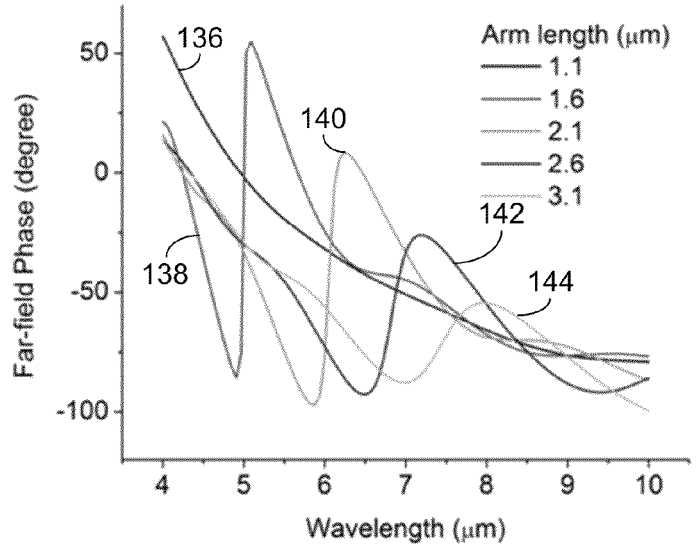
FIG. 62 plots the simulated phase of the reflected wave from an array of cross antennas, as shown in FIG. 61, as a function of wavelength and the arm length of the cross antenna.
Figure 63:
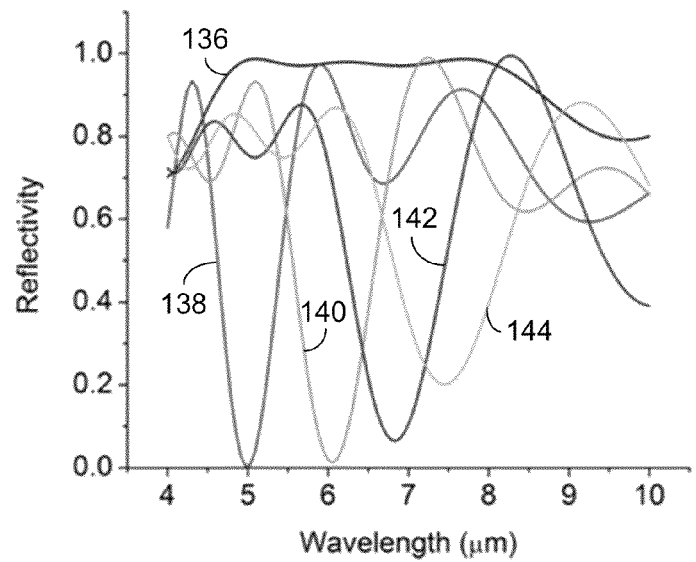
FIG. 63 plots the simulated reflection spectra from the array of cross antennas, as shown in FIG. 61, as a function of the arm length of the cross antenna.

Cross antennas 24 that have a much thinner width (where the other geometric parameters are kept the same), as shown in FIG. 61, show a very different phase response, as seen in FIG. 62. In this case, direct reflection from the back plane 132 has a large contribution to the total reflection. The phase modulation is not large because reflected waves from the back plane 132 do not have controllable phase response. The reflectivity of this embodiment is shown in FIG. 63.

Figure 64:
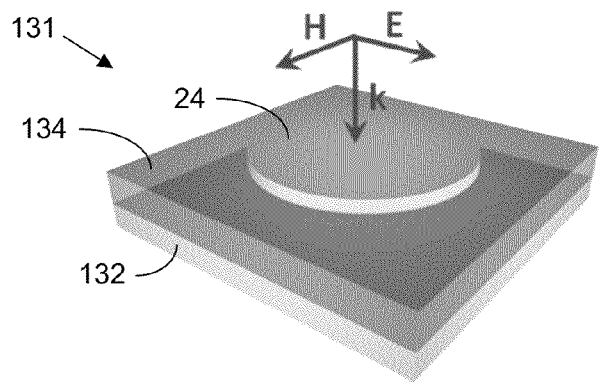
FIG. 64 is a schematic illustration of one reflect-array element based on a disc antenna.
Figure 65:
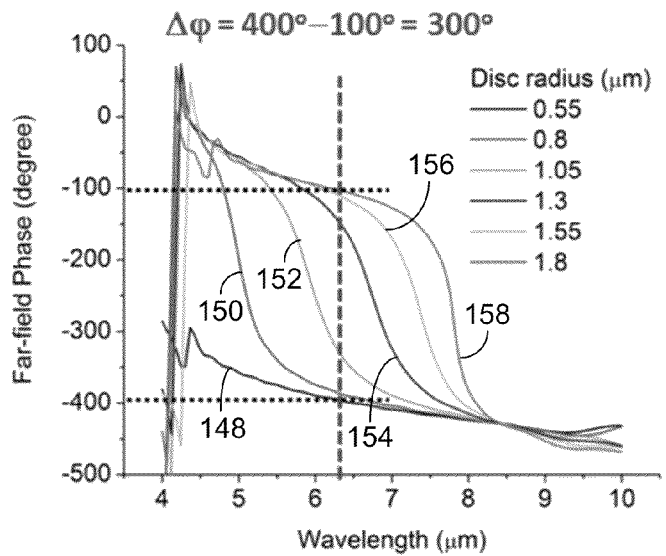
FIG. 65 plots the simulated phase of the reflected wave from an array of disc antennas, as shown in FIG. 64, as a function of wavelength and the arm length of the disc antenna.
Figure 66:
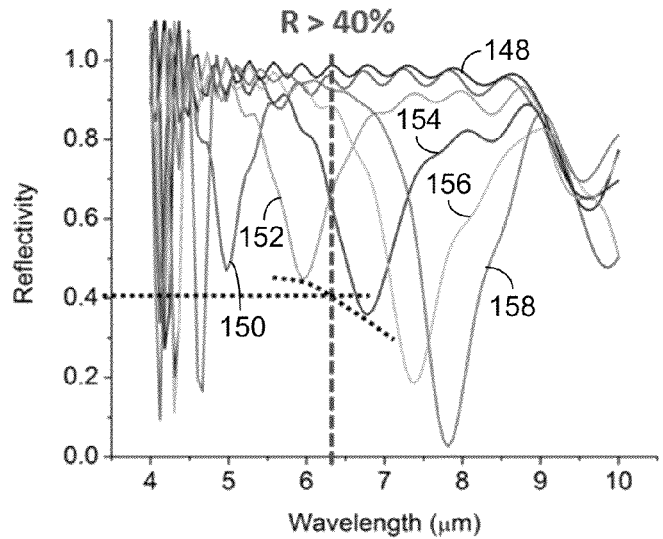
FIG. 66 plots the simulated reflection spectra from the array of disc antennas, as shown in FIG. 64, as a function of the arm length of the cross disc antenna.

FIG. 64 shows the design and performance of reflect arrays 131 based on disc antennas 24. The design is simple yet effective. The antenna thickness is 50 nm and the thickness of the $SiO_2$ spacer 134 is 400 nm. The ground plane 132 is gold. The array 131 has a square lattice and the lattice constant is 4 μm. The simulated phase of the reflected wave from an array of disc antennas 24 as a function of wavelength and the disc-antenna radius is plotted in FIG. 65, where the far-field phase for antennas 24 with the following disc radii are plotted: 0.55 μm 148, 0.8 μm 150, 1.05 μm 152, 1.3 μm 154, 1.55 μm 156, and 1.8 μm 158. The phase-response diagram of FIG. 65 shows that, at $2=6.3$ μm, the phase coverage is about 300°, achieved by adjusting the radius of disc antennas 24 from 0.55 to 1.8 μm. Simulated reflection spectra from the array 131 as a function of the disc-antenna radius are plotted in FIG. 66. The reflectivity of the array 131 is overall larger than that of the design based on cross-antennas at $2=6.3$ μm (minimum ~40%).

The reflect arrays 131 can provide the following advantages compared to other technologies. First, the reflect arrays 131 can be in the form of an optically-thin planar optical device. The thickness of the active antenna arrays 131 can be less than a few percent (e.g., <5%) of the free-space wavelength. Large changes in the optical response (i.e., amplitude, phase, and/or polarization of the scattered light) are achieved through optical scattering at the antennas 24, instead of through an accumulative effect via propagation. Conventional optical components tend to be bulky and rely on propagation effect to control light.

Second, the form of the reflect arrays 131 can be based on conventional metals and dielectrics. The fabrication techniques can be standard optical lithography or electron-beam lithography on flat surfaces. In contrast, conventional optical components in the mid-infrared may use exotic materials and sophisticated 3D fabrication.

Third, the reflect arrays 131 can mold optical wavefronts with high spatial resolution (i.e., sub-wavelength resolution) because the constituent antennas 24 have sub-wavelength footprints. Sub-wavelength resolution allow for engineering not only the optical far-field but also the near-field and meso-field. Conventional optical components are designed to shape only the far-field. For example, bulky lenses can only focus light in the far-field; liquid-crystal spatial light modulators have poor resolution (where pixel size is much larger than wavelength) and cannot control near-field and meso-field.

Though other wavelengths can likewise be targeted, targeting the generation of mid-infrared radiation with these embodiments is especially advantageous because existing optical components for this spectral range are poor; and the devices described, above, may create niche applications much more easily. Specific applications using mid-infrared reflect-array include various flat optical components (e.g., flat lens, wave plates, frequency selective surfaces, spatial light modulators, holograms) for optical instruments (e.g., camera, telescope, biomedical imaging instruments, scientific research instruments).

In describing embodiments of the invention, specific terminology is used for the sake of clarity. For the purpose of description, specific terms are intended to at least include technical and functional equivalents that operate in a similar manner to accomplish a similar result. Additionally, in some instances where a particular embodiment of the invention includes a plurality of system elements or method steps, those elements or steps may be replaced with a single element or step; likewise, a single element or step may be replaced with a plurality of elements or steps that serve the same purpose. Further, where parameters for various properties or other values are specified herein for embodiments of the invention, those parameters or values can be adjusted up or down by $1/100^{th}$, $1/50^{th}$, $1/20^{th}$, $1/10^{th}$, $1/5^{th}$, $1/3^{rd}$, $1/2$, $2/3^{rd}$, $3/4^{th}$, $4/5^{th}$, $9/10^{th}$, $19/20^{th}$, $49/50^{th}$, $99/100^{th}$, etc. (or up by a factor of 1, 2, 3, 4, 5, 6, 8, 10, 20, 50, 100, etc.), or by rounded-off approximations thereof, unless otherwise specified. Moreover, while this invention has been shown and described with references to particular embodiments thereof, those skilled in the art will understand that various substitutions and alterations in form and details may be made therein without departing from the scope of the invention. Further still, other aspects, functions and advantages are also within the scope of the invention; and all embodiments of the invention need not necessarily achieve all of the advantages or possess all of the characteristics described above. Additionally, steps, elements and features discussed herein in connection with one embodiment can likewise be used in conjunction with other embodiments. The contents of references, including reference texts, journal articles, patents, patent applications, etc., cited throughout the text are hereby incorporated by reference in their entirety; and appropriate components, steps, and characterizations from these references may or may not be included in embodiments of this invention. Still further, the components and steps identified in the Background section are integral to this disclosure and can be used in conjunction with or substituted for components and steps described elsewhere in the disclosure within the scope of the invention. In method claims, where stages are recited in a particular order—with or without sequenced prefacing characters added for ease of reference—the stages are not to be interpreted as being temporally limited to the order in which they are recited unless otherwise specified or implied by the terms and phrasing.

What is claimed is:
1. An optical plate, comprising:
    a substrate; and
    a resonator structure comprising an array of resonators formed on or in the substrate, wherein each of a plurality of the resonators is configured for multiple resonances, and wherein the resonator structure is configured to produce an abrupt change in at least one of phase, amplitude and polarization of incident radiation.

2. The optical plate of claim 1, wherein the resonator structure is configured to change at least one of phase, amplitude or polarization of incident radiation by different amounts across an interface of the resonator structure and the substrate.

3. The optical plate of claim 2, wherein the resonators are plasmonic antennas.

4. The optical plate of claim 3, wherein the antennas comprise at least two rods joined to form a V-shape.

5. The optical plate of claim 4, wherein different antennas in the array have rods joined at different angles.

6. The optical plate of claim 5, wherein the antennas are arranged in repeating sub-units where adjacent antennas within each sub-unit have rods joined at different angles.

7. The optical plate of claim 3, wherein the antennas comprise at least three rods joined to form a Y shape.

8. The optical plate of claim 3, wherein the antennas have lengths in a range from 10 nm to 5 µm.

9. The optical plate of claim 3, wherein the antennas have a spacing between antennas that is in a range from 10 nm to 5 µm.

10. The optical plate of claim 3, wherein the antennas comprise a metal.

11. The optical plate of claim 1, wherein the resonators are selected from at least one of electromagnetic cavities, apertures, quantum dots, nanoparticle clusters and plasmonic antennas.

12. The optical plate of claim 1, wherein the substrate comprises silica or silicon.

13. The optical plate of claim 1, wherein the optical plate has a radial phase distribution that enables the plate to function as a flat lens.

14. The optical plate of claim 1, wherein the optical plate has a radial phase distribution selected from a hyperboloidal distribution, a spherical distribution, and a parabaloidal distribution.

15. The optical plate of claim 1, wherein the optical plate has a conical radial phase distribution enabling the plate to function as an axicon.

16. The optical plate of claim 1, wherein the substrate is an optical fiber including at least one of an input facet for transmitting optical signals into the optical fiber and an output facet for transmitting optical signals out of the optical fiber.

17. The optical plate of claim 16, wherein the resonator structure is at the input facet or output facet of the optical fiber.

18. An optical plate, comprising:
a substrate; and
a resonator structure comprising an array of multi-resonance plasmonic antennas formed on or in the substrate, wherein the resonator structure is configured to change at least one of phase, amplitude and polarization of incident radiation by different amounts across an interface of the resonator structure and the substrate, wherein the antennas comprise at least two rods joined to form a V-shape, wherein the antennas are arranged in repeating sub-units where the rods of adjacent antennas within each sub-unit are joined at different angles, and wherein each sub-unit is in the form of a linear row of n antennas spaced at n/Γ intervals, where Γ is the length of each sub-unit, and wherein each sub-unit has the same sequence of antenna configurations.

19. The optical plate of claim 18, wherein each sub-unit includes a repeating series of antennas in each sub-unit, wherein the orientations of the antennas change across the iterations of the series.

20. The optical plate of claim 18, wherein adjacent sub-units are offset so that corresponding antennas among a pair of adjacent sub-units are shifted by xΓ/n, where x is an integer from 1 to n−1.

21. The optical plate of claim 20, wherein x is n/4, and wherein the optical plate is configured to output an extraordinary beam with circular polarization.

22. The optical plate of claim 20, wherein x is n/8 or 3n/8, and wherein the optical plate is configured to output an extraordinary beam with circular polarization.

23. A reflect array, comprising:
a substrate comprising a metal;
a resonator structure comprising an array of multi-resonance plasmonic antennas formed on or in the substrate, wherein the resonator structure is configured to change at least one of phase, amplitude and polarization of incident radiation by different amounts across an interface of the resonator structure and the substrate; and
a dielectric spacing layer between the resonators and the metal substrate, and wherein the thickness of the dielectric spacing layer is less than less than 20 µm.

24. The reflect array of claim 23, wherein the antennas, dielectric spacing layer and metal substrate are configured to create a resonance in the antennas when irradiated with light and to create a dipole image of the resonance in the metal substrate, and wherein the antennas are configured to emit radiation in the mid-infrared range.

25. The optical plate of claim 24, wherein the antennas have feature dimensions in the range of 0.5 to 4 µm.

26. The optical plate of claim 25, wherein the feature dimensions in the range of 0.5 to 4 µm are rod widths.

27. A multi-layer structure comprising a plurality of stacked layers of resonator structures formed on or in at least one substrate, wherein each of the resonator structures is configured to produce an abrupt change in at least one of phase, amplitude and polarization of incident radiation.

28. A method for manipulating radiation, comprising:
receiving incident light radiation on an optical plate comprising a multi-resonance resonator structure on or in a substrate; and
reemitting light radiation from the resonator structure with a change in at least one of phase, amplitude and polarization in comparison with the incident light radiation.

29. The method of claim 28, wherein the radiation is received on one side of the substrate and reemitted from an opposite side of the substrate.

30. The method of claim 28, wherein the radiation is received on one side of the substrate and reemitted from the same side of the substrate.

31. The method of claim 28, wherein the change in at least one of phase, amplitude and polarization of incident radiation is at least 5%.

32. The method of claim 28, wherein the resonator structure shifts the phase of the incident radiation by more than $\pi$.

33. The method of claim 28, wherein the resonator structure comprises an array including V-shaped antennas that resonate and reemit the incident radiation in both symmetric and anti-symmetric modes.

34. The method of claim 33, wherein the antennas have lengths less than the wavelength of the incident radiation.

35. The method of claim 33, wherein the antennas have a spacing between antennas that is less than the wavelength of the incident radiation.

36. The method of claim 28, wherein the resonator structure refracts the incident radiation at an angle non-parallel to the incident radiation.

37. The method of claim 28, wherein the resonator structure focuses the incident radiation.

38. The method of claim 28, wherein the resonator structure generates a helicoidal wavefront.

39. The method claim 28, wherein at least one of the resonator structure and the substrate includes a material that has an optical constant that can be tuned by an external signal, the method further comprising applying the external signal to tune the optical properties of at least one of the resonator structure and the substrate.

40. The method of claim 28, wherein the substrate comprises a material that is transparent at the operating wavelength of the incident radiation.

* * * * *

UNITED STATES PATENT AND TRADEMARK OFFICE
CERTIFICATE OF CORRECTION

PATENT NO.        : 8,848,273 B2
APPLICATION NO.   : 13/832403
DATED             : September 30, 2014
INVENTOR(S)       : Nanfang Yu et al.

It is certified that error appears in the above-identified patent and that said Letters Patent is hereby corrected as shown below:

In The Specification

At Col. 1, line 13, immediately after the "Related Applications" paragraph and immediately before the "Background" section, the following new section is added:

-- GOVERNMENT SUPPORT
This invention was made with government support under Grant No. PHY-0646094 awarded by the National Science Foundation. The Government has certain rights in the invention. --

Signed and Sealed this
Twenty-second Day of March, 2016

Michelle K. Lee
*Director of the United States Patent and Trademark Office*